US012793153B2

(12) United States Patent
Brown

(10) Patent No.: US 12,793,153 B2
(45) Date of Patent: Nov. 10, 2026

(54) GENERATING AND MANAGING DYNAMIC CONTENT

(71) Applicant: HashChi Collectibles LLC, Marietta, GA (US)

(72) Inventor: Scott Brown, Marietta, GA (US)

(73) Assignee: HashChi CyberFi LLC, Marietta, GA (US)

( * ) Notice: Subject to any disclaimer, the term of this patent is extended or adjusted under 35 U.S.C. 154(b) by 583 days.

(21) Appl. No.: 17/968,755

(22) Filed: Oct. 18, 2022

(65) Prior Publication Data

US 2023/0252591 A1 Aug. 10, 2023

Related U.S. Application Data

(60) Provisional application No. 63/257,085, filed on Oct. 18, 2021.

(51) Int. Cl.
*G06Q 50/18* (2012.01)
*G06Q 20/12* (2012.01)

(52) U.S. Cl.
CPC ....... *G06Q 50/184* (2013.01); *G06Q 20/1235* (2013.01); *G06Q 2220/18* (2013.01)

(58) Field of Classification Search
CPC ............. G06Q 50/184; G06Q 20/1235; G06Q 2220/18
See application file for complete search history.

(56) References Cited

U.S. PATENT DOCUMENTS

| | | | | |
|---|---|---|---|---|
| 11,113,754 | B2 * | 9/2021 | Andon | H04W 4/029 |
| 11,195,053 | B2 * | 12/2021 | Kim | G06F 18/2148 |
| 2022/0358186 | A1 * | 11/2022 | Deuel | G06Q 40/04 |
| 2023/0070586 | A1 * | 3/2023 | Kapur | G06Q 20/123 |
| 2023/0102606 | A1 * | 3/2023 | Advani | H04L 9/50 726/4 |
| 2023/0186262 | A1 * | 6/2023 | Busch | G06F 21/1065 705/51 |

OTHER PUBLICATIONS

Github, Mar. 10, 2021, Enterprise Budgets for Organizations and Services Issue 178 (Year: 2021).*

* cited by examiner

*Primary Examiner* — Jessica Lemieux
*Assistant Examiner* — Nico L Padua
(74) *Attorney, Agent, or Firm* — Fish & Richardson P.C.

(57) ABSTRACT

Methods, systems, and apparatus, including computer programs encoded on computer storage media, for generating objects in a collection, for example, that may be generated by AI-based processing resources. The generation of digital objects in the collection may be controlled by transformation rules so that any given object maintains at least one property with any other object in the collection and differs by at least one property.

24 Claims, 17 Drawing Sheets

100

FIG. 2b
VRYNT Origins
220
COMPONENTS
PACKS
ORIGINS
928
51
16
500 VC
55.8K VC
VRYNT

FIG. 2c
VRYNT Origins
224
NFTS
PACKS
ORIGINS
BY VRYNT
928/1000
51
16
500 VC
55.8K VC
YELLOW BACKGROUND
MAKE OFFER
MOON GRAVITY
MAKE OFFER
WARPED TOWER
MAKE OFFER
MINT VRYNT LOGO
MAKE OFFER

800

900

GENERATING AND MANAGING DYNAMIC CONTENT

CROSS-REFERENCE TO RELATED APPLICATION

This application claims the benefit of U.S. Provisional Application No. 63/257,085, filed Oct. 18, 2022, the contents of which are incorporated by reference herein.

BACKGROUND

Sometimes it is necessary to track attributes and the history of an object.

SUMMARY

In a digital world, the identification of objects is necessary to distinguish one digital object from another. Whether the digital object is artwork, a key, a string of code, or a combination thereof, the uniqueness of an object is more than just a visual attribute. The uniqueness of a digital object can consist of the uniqueness of the components used to create it, where it was created, under what circumstances it was created, then after the creation of the digital object, the path of that object through cyber space can add to the uniqueness. Methods can be used to track all these attributes of a digital object and more.

These digital objects can serve the purpose of artwork, identification, access, authentication, validation, or any combination thereof. These objects can exist within a system that tracks the movement, use, and position of the objects throughout. More objects and components can be added to this system. The components can combine with other components to or combine with other objects to create more objects. The path and history of these objects adds and compounds to the signature of each object making it more unique over time.

In one sense, one innovative aspect of the subject matter described in this specification can be embodied in methods that include the actions of enabling an administrator to define a collection of digital objects, the collection of digital objects including a first object. The system enables the administrator to define one or more transformation rules used to generate a second object, wherein the second object is derived from at least a first property of the first object, and has at least a second property that is different than a first property of the first object. The system loads the collection of the digital objects and transformation rules to a publishing server. The system enables a user in an online community to generate a third digital object in the collection using the transformation rules, the transformation rules requiring the third digital object being derived from at least a first property of the digital object and having at least a third property that is different than the third property of the first object and the second object.

In another sense, a system receives one or more attributes of two or more components. The system receives one or more attributes of a creator and combines using a creator, the two or more components into a first object. The system determines, using the combination of two or more components, one or more attributes of the first object. In response to determining one or more attributes of the first object, the system causes the one or more attributes of the first object to become part of the first object.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in various implementations and may result in one or more of the following advantages. The tracking of digital objects and historical attributes can serve as an auditable past for quality assurance and authenticity. The assurance of a digital objects authenticity can serve the purpose of several security solutions including, authentication, validity, scarcity, uniqueness, or any combination thereof.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
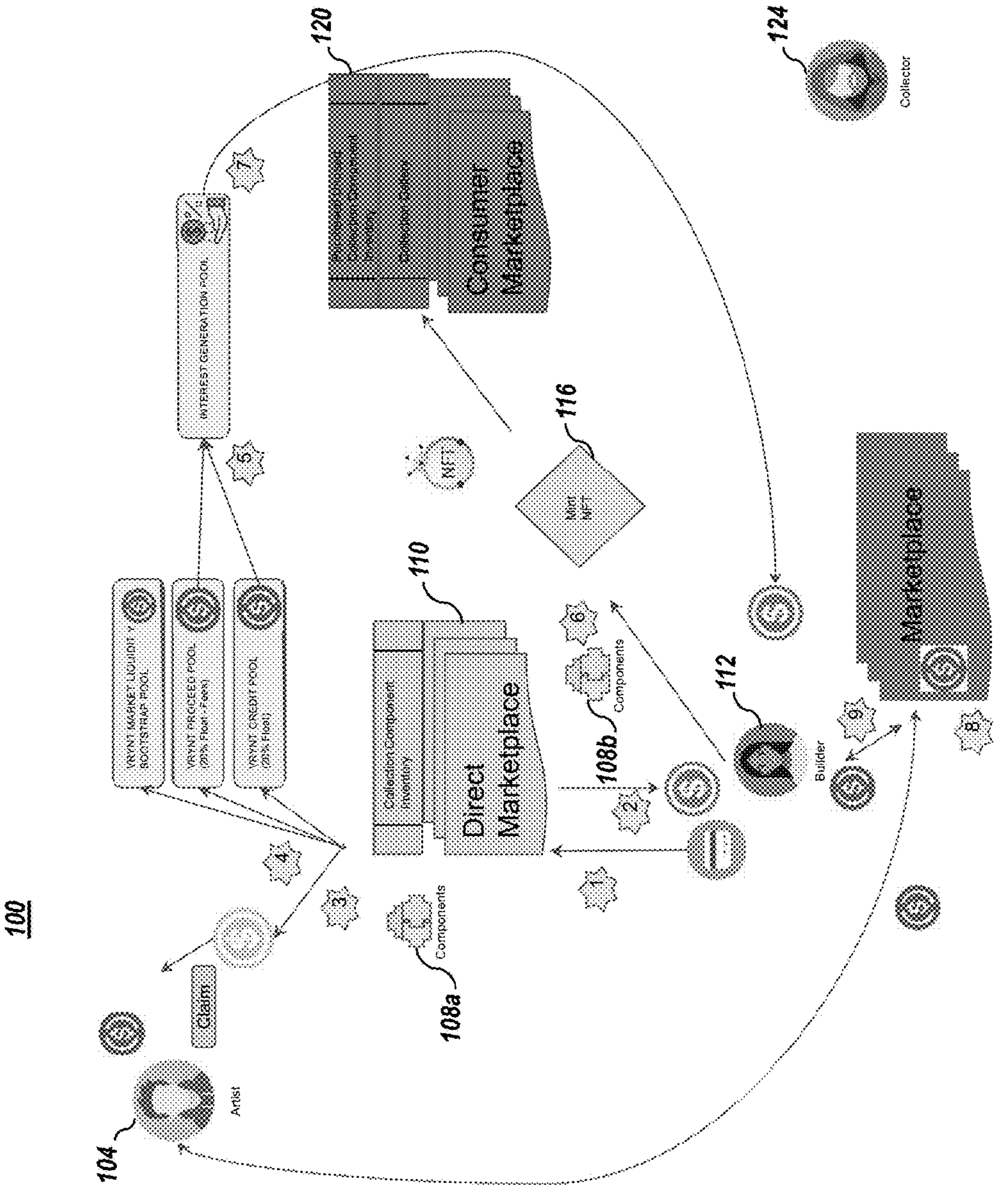
FIG. 1*a* is an example environment in which components and objects are transferred and how users and objects interact with the consumer marketplace or direct marketplace

The growth of the Internet has provided users with access to unprecedented processing power, particularly in the form of access to on-demand, cloud-based resources for AI (artificial intelligence). The use of AI in these circumstances allows users to unprecedented amount of content. In particular, AI allows content creators, and even users, i.e., consumers, to generate artistic collections that are both distinct of other instantiations of content while being related to other instantiations within a collection. For example, an artist can define a limited release of an art collection. The art collection may start from a seed image that the artist generates. An administrator then may link the seed image (or components of an image) to an AI engine. The artist then may present one or more controls that modify the image according to the criteria specified in the controls. For example, the controls may include six AI-based modification themes. Each of the controls may include a slider bar that allows the user to deposit tokens (e.g., pay) for modifications to the seed image according to the AI criteria. The artist and administrator may both limit the total number of objects in the collection (e.g., 50 objects) and the number of modifications (e.g., 250 modifications) across the community of users interacting with the collection. As a user may experiment with different modifications to preview different modifications before deciding to purchase or mint an object. When the object is purchased, that particular object may be recorded to a log that precludes others from designing an object with that look and feel. As future users in the community explore a design of their own object in the collection, the future users may be precluded from incorporating modifications associated with the previously-purchased digital object. In that configuration, every purchased object in the collection of 50 objects is unique from other objects in the collection.

The artist and/or administrator may define the degree of uniqueness from other objects in the collection. For example, the administrator may require that any two objects must differ by at least one measure, that is, a given object must differ by at least one property from any other object in the collection. Alternatively, the administrator may require that each object differ from at least every other object by at a threshold of metrics (e.g., 20 adjustments/degrees/thresholds/tokens of difference). The requirement to maintain a threshold degree of difference may in fact reduce the size of the collection of objects. In particular, while the artist designing the collection may configure the collection to include up to 50 objects, early user activity and design choices may reduce the number of available objects to a lower number. For example, the system may determine that there are no design choices satisfy the threshold degree of difference criteria. Or, as the 40$^{th}$ object is purchased, the system may determine that only 5 possible variations remain and that the remaining users can only design additional object using a limited number of modifications. A slider bar control for the users attempting to design the remaining objects may be modified to "gray out" or preclude those modifications no longer available because of the size of the requirement to maintain a threshold degree of object diversity. Or, as a user is makes initial selections, the slider bar controls may be modified to limit the degree to which user modification of the object is limited.

Once an object is designed, the object may ported to other design environments. For example, a user may initially download the object (e.g., an non-fungible token) to a digital wallet (e.g., Apple Wallet) or a collection management application. The user then may port the object to other systems and/or real-world devices. For example, the user pay to transfer the digital object to a character import tool in an online game (e.g., a massively multiplayer online role-playing game in a gaming system like the Sony PlayStation 5™). Alternatively, the user may order a helmet with the design of the digital object. In yet another example, the digital object may be used to define a user's avatar and environment of a user's home environment in a virtual world.

Further, an artist, the administrator, and/or a user may have limited access, rights, knowhow and/or permissions to access an AI-based content generation and modification system. That is, a user may possess limited ability to launch a batch job on a network GPU bank to generate a look and feel. Even for those services that offer a freeform/natural language processing capability to generate and/or revise digital objects in a network-based AI service, the ability for an artist, administrator, or user to link that capability to a vision for a collection designer may be limited. As a result, a system may make packages of network-based AI service capability available to selectively modify the framework/design template for an object. Each of the packages of packages of network-based AI service capability may be organized according to a descriptive word or construct used as an input to the network-based AI service. For example, an administrator may allow an artist to add a "wind" control that simulates the presence of wind having varying degrees of velocity according to the slider bar value selected (e.g., 0-100). User selection of wind value may cause the network-based AI service to render the object as if a corresponding degree of wind were present.

In another example, the artist may be design a virtual world with non-player characters present. A first slider control may control the size of the virtual world in terms of virtual square miles. The second slider control may control the population of the virtual world. A third slider control may control the degree of personality realism of the non-player characters. Still a fourth slider control may control the geography of the virtual world.

Activation of each of these slider controls may include a computational cost. For example, moving the first slider control from 0-2 may require two units of GPU cycles to generate the virtual world for an area representing two square miles in the virtual world. These two GPU cycles may impose a financial cost on the administrator. The administrator then may meter the user's modifications so that the user pays according to the processing costs incurred by their design choices. Similarly, the user may allocate 10 GPU cycles to provide an increased level of non-player character "intelligence" or "humanity" as the user and others navigate their virtual world. Finally, the user may allocate 15 GPU cycles to provide the highest degree of realism in the virtual world. In one setting, allocating more GPU cycles provides more varied cartography (e.g., mountains) while in other settings, allocating more GPU cycles provides increased granularity and resolution of constituent objects (e.g., adding more furniture inside of a virtual house).

In still other implementations, the user may be given a very limited interface to describe the modifications that are added. For example, the user may be given a list of words to select to modify an image. In another implementation, the user is allowed to enter (1) one or more text words and (2) the number of processing units that should be used to process the digital object according to the entered keyword.

While many of these techniques are described in terms of AI-based modification to imagery, the techniques also may be applied to non-AI-based collections and also to non-imagery based digital objects. For example, an artist may define different components that a user can place into an image. In another example, a user may select portions of song lyrics used to generate an image. In still another example, a user may design artwork used to define a screenplay using an AI-based script generation engine. AI-based movie generation engine may turn the screenplay and imagery into a movie. The controls described above may be used to control the length, plot, genre, cinematography and tone of a movie.

This application describes some of several configurations possible through the application of the disclosed principles. For instance, some configurations can include the interaction of digital entities within a particular environment. In this example, users can interact with digital entities within the environment to create, share, trade, change, modify, or any combination thereof the digital objects.

This example environment can include digital entities at three different levels, for instance, components, objects and tokens. The environment, components, objects and tokens can all be digital or some of them can be digital. In one example of a partially digital environment, the environment can be an electronic art gallery, the objects can be the individual pieces of art, the components can be the canvas, paint, and other parts of the object, and the token can be one or more objects, components, a second object, or any combination thereof.

In this example environment components can be the building blocks of objects. Two or more components can combine to make an object. Objects can exists that contain the attributes and characteristics of the components used to make it. The tokens can be brought into and moved out of the digital environment. Tokens can be exchanged for components, objects, or both.

Within this example gallery environment, different users can interact with the digital entities. For instance, an artist can exchange tokens for components. The components can include, but are not limited to digital canvases, decals, colors, paints, logos, images, designs, characters, fonts, depictions of other objects and more. All of these components can be used by the artist to create a digital object. The digital object can incorporate one or more attributes of the components that were used to create it.

For example, the artist can use the components of a helmet, a design, a circle, and a logo and use these components to create an object that is a helmet with a design wrapped around the outside, a circle on the left side, and a logo along the back. As part of a collection management system, the artist can use a rule system to ensure that helmets within his collection are unique and different from one other. That is, the artist may define a limited pool of currency available to modify or revise an overall framework within the collection. There may be 100 currency units available to modify a release of 25 helmets. A user may spend a unit of currency to add an additional object to the rendering. A user may similarly purchase and spend an additional 4 currency units on AI-based modifications (e.g., chaos), where the AI-based modification represents an expenditure of AI-based resources to introduce a thematic element to the underlying digital object. In the example of expending four currency units of chaos, the modification may modify the underlying object to modify the underlying image by spending four cycles on a cloud-based GPU running a particular chaos algorithm. On instance, the chaos algorithm represents a transformation determined to be responsive to users with a designated profile (e.g., users age 18-25 known to like the works of a particular artist or the computational substitution of colors offset by X dimensions on a color chart).

Within this example environment an artist can transfer the completed object to the gallery. The gallery can serve as a space in which multiple users can interact with the object. For example, the artist can send the designed helmet object to the gallery. Once at the gallery other users can interact with, designed helmet object in several ways.

In the example gallery, users can interact with objects in ways that can be measured. Measurements of interaction can include but are not limited to the number of views, the length of views, the number of interactions, material transferred to the object, the length of time the object is on display, when users view the object, or any combination thereof. For instance, the designed helmet object in the gallery is viewed by 100 users, then the designed helmet object is transferred to another artist's gallery where it remains for 10 days and receives 1000 more views.

In the example gallery, the object can be removed from the gallery and transferred either to another gallery or another digital location. For example, the designed helmet object can move from the gallery to an artist's private collection. The movement, time in location, which artists has the object are all measurements that can be tracked within the computational environment.

Within the example environment, certain users can be assigned as administrators. The administrators can assign attributes, rules, limits, conditions, thresholds, or any combination thereof to all digital entities within the environment and to the environment itself. For instance, an administrator can establish a rule that at least three components are required to make an object, such as a logo, a background image, and a shape. Another example rule could be that components will be distributed in groups of four. Another example limit could be that any individual user can only hold ten components and 3 objects at a time. An example attribute can be the scarcity or rarity of an object. An example threshold can be the requirement of certain components such as at least one logo, one color, and one background image. Another example limit can be that only one type of component can be used per object.

Within the example environment, the attributes, characteristics, nature or any combination thereof of an object can change over time. For example, the length of time that a component is held by an artist can change the scarcity or rarity of the component. The scarcity or rarity of a component or an object can change when the total number of those components within the environment change. The scarcity or rarity of a component or object can change based on where it is located or which users have interacted with it in the past. Administrators of the system can interact with the components and objects and adjust the attributes of the components or objects. Users, content creators (e.g., artists), and administrators may specify the manner in which the attributes change.

In this example environment, attributes of components can be established that require the components to be unusable after the components have been used to create an object. For instance, an artist can combine the helmet, design, circle and logo to create a designed helmet object. In this example, once the helmet object is finalized, the individual components of a helmet, design, circle, and logo can no longer be used to create other helmet objects. Rather, only the completed helmet object, i.e., the designed helmet object, exist within the environment.

Attributes of components, objects, or both can include, but are not limited to time since creation, location history, current location, scarcity, rarity, or more. The creator of a component can affect the attributes of a component by the nature of who the creator is, when the components were created, for what purpose the components were created, the number of components, the type of components, or more.

The attributes of components may be combined when an object is created. For instance, a component with a 'ultra rare' attribute can combine with a component with a 'common' attribute. Once combined, an aggregate different rarity score may be created. This may include an aggregated different rarity score such as 'rare.'

FIG. 1*a* is an example environment 100 in which components 108*a-b* and objects are transferred and how users and objects interact with the consumer marketplace 120 or direct marketplace 110. Within the example environment artists 104, builder 112, and collectors 124 can exchange digital entities including components 108*a-b* and objects 116 between different digital areas. Users can interact with the digital entities throughout the process and in several different ways.

The artist 104 can create, alter, or perform a combination of creating and altering of components 108*a-b*. An artist 104 can create the initial values, attributes, types, styles, shapes, characteristics, layout, design, and more for the components 108*a*. The substance used to create the components 108*a-b* can be created within the environment 100 or imported to the environment 100. For example, the artist 104 can import to the environment 100 artwork made outside the environment 100 (e.g., using art generated on a tablet). The artwork can be digitized and then manipulated by the artist 104 to create components 108*a*.

Components 108 can have attributes associated with the individual components 108*a-b*. The attributes can vary in number and type. For example, a component 108*a* can have an attribute describing the scarcity, age, and type of component 108*a*.

The artist 104 can create, alter or perform a combination of creating and altering of the attributes of components 108*a-b*. For instance, an artist 104 can determine and ascribe to the component 108*a* a value for scarcity of 'Rare' and a type. The age of component 108*a* can change over time using the date of creation as a time stamp. The attributes of components 108 and objects 116 can change over time based on several factors, including the interaction of other users with the component 108 and objects 116.

Components 108 can be bundled into packs. For example, an artist 104 can create a series of components 108 with a share theme, such as motorcycles and combine these components 108 sharing a theme into a pack. The pack can be transferred together or in part to other users.

The components 108*a-b* can be exchanged within the direct marketplace 110. A user can exchange tokens for one or more components 108 or objects 116. For instance, a user can possess tokens on a consumer marketplace and trade tokens received for one or more components 108.

The components 108*a-b* can be exchanged between users in the consumer marketplace 120. A user can exchange components 108 for other components or objects 116. The user can trade some of those one or more components 108 for one or more objects 116.

A builder 112 can assemble the components 108*a-b* into an object 116. Components 108 can become unusable after combined to create an object 116. For example, a builder 112 can use two or more components 108 such as a background image, logo, and shape to create an object 116, such as a piece of artwork.

A builder 112 can assign created objects 116 to collections. For instance, a builder 112 can create a series of objects 116 with a motorcycle theme and link them into a motorcycle collection.

Certain rules, limits, thresholds, criteria or a combination thereof can govern the assembly of components 108*a-b* into objects 116. For instance, a rule can require at least three or more components to be combined in order to create an object 116. In another instance, of the components 108 that can be required, at least one background image, one logo, and one shape can be combined to make an object 116. In another example, the components 108 that can be required can include two shapes and one background image to make an object 116.

Administrators, artists or other users can establish the rules, limits, thresholds, criteria, or combination thereof. For instance, an administrator can establish that, to create an object 116, at least one background picture component 108 is required. An artist 104 can require that every object 116 made requires the use of at least one logo component 118.

Among other capabilities, the builder 112 can send the object 116 to the consumer marketplace 120. For example, a builder 112 can send one or more objects 116 (e.g., artwork) to the consumer marketplace 120. A builder 112 can retrieve objects 116 from the consumer marketplace 120 and place them in private holding areas that can be accessible only to the builder 112.

The consumer market place 120 can act as a public arena for interaction with objects 116, components 108, all users, or a combination thereof. For instance, any user, artists 104, builder 112, or collector 124, can interact with an object 116 in the consumer marketplace 120 through 'likes', comments, 'clicks', donations of tokens, or more One or more consumer marketplaces 120 can exist within the environment 100. For example, separate consumer marketplaces 120 can exist based of the interest or subject matter contained within the consumer marketplace 120.

Any user artists 104, builder 112, or collector 124 can interact with the objects 116 in the consumer marketplace 120. For example, a collector 124 can participate in a poll ranking the objects 116 that are in the consumer marketplace 120. In another instance a user can participate can interact with an object 116 by 'up voting' the object or leaving a comment. In another example, simply the fact that the user looked at the object 116 can be tracked and used to affect the user or the object 116.

The interaction of components 108*a-b*, objects 116, artists 104, builders 112, collectors 124, and environment 100 all can affect changes to the attributes and characteristics of each other. For instance, a user can vote on several objects 116 or components 108 in an artist 104's collection. The votes cast for the objects 116 or components 108 can affect some or all of the objects 116, components 108, artist 104, user or any combination thereof. In another instance, a user can exchange tokens for an object 116 in the consumer marketplace 120. The exchange of tokens for an object 116 can affect any object 116, a collection that the object 116 is a part of, the artist 104, the user or any combination thereof.

Artificial Intelligence (AI) can be used to modify the digital entities within environment 100. In one example, AI is used to modify objects within a collection. In another example, AI is used to track the statistics, metrics, characteristics, attributes, and other measureable features of digital entities within the environment 100 in order to describe how users respond (e.g., prefer or dislike) to certain objects in a collection. In still another example, AI is used to maintain a threshold degree of diversity between objects in a collection, or between aspects of an object in an invention. The AI may require for example, that each image (or portion of an image) undergo one GPU bundle of AI-based modification relative to other objects in the collection. The rules may specify that any transformation applied must result in a digital objects that differs by at least one measure from another object in the collection.

In some examples a single user can perform the role of artist 104, builder 112*a*, and collector 124. For example, an artist 104 can create content such as components 108, then can go to the consumer marketplace 120 and exchange components 108, objects 116, or tokens for other objects 116 in the consumer marketplace 120. The artists 104 can then add the object 116 to a private collection held by the artist 104.

In some examples the objects 116 can be bound in a cryptographic process to create Non-Fungible Tokens (NFTs). For instance, when the artist 104 creates the object 116 from components 108*a-b*, the object 116 can become an NFT. This process can use AI to incorporate the attributes of the components 108*a-b* into the object 116 to create the NFT.

Figure 1B:
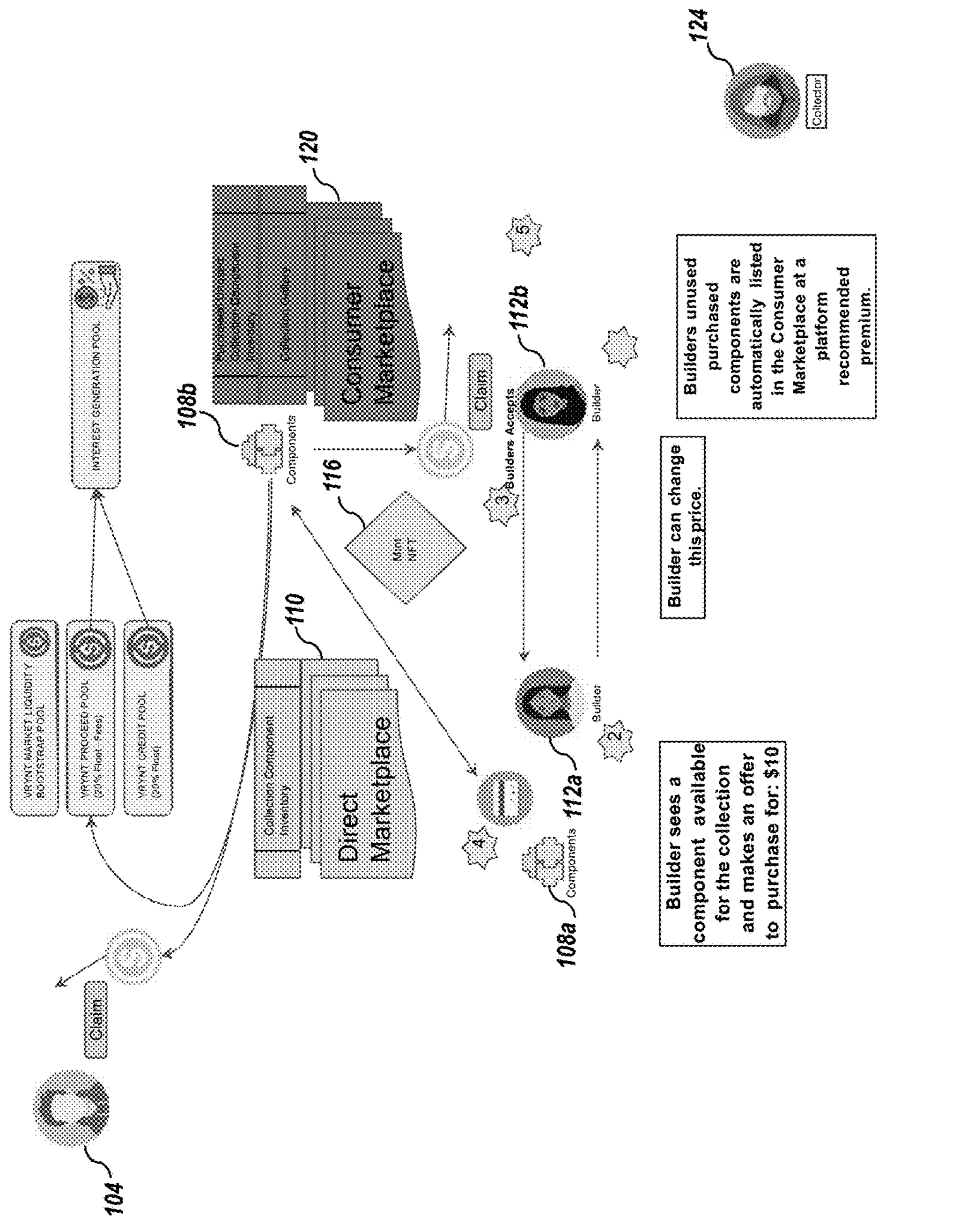
FIG. 1*b* is an example environment in which users interact to exchange components and objects.

FIG. 1*b* is an example environment 100 in which users interact to exchange components 108 and objects 116. Users in the environment can include administrators, artists 104, builders 112, collectors 124, or more. The users in the environment can exchange tokens, components 108, objects 116, and more.

In the example environment 100 builders 112*a-b*, artists 104, and collectors 124 can interact with each other. Collectors 124 can survey the collected objects (e.g., art work) on one another as they browse galleries published by an environment builder 112*a*. Collectors 124 can survey builders 112 or artists 104 and can survey the components 108 or objects 116 created by the builders 112 or artists 104.

The interactions between users can affect the users, for instance, as collectors 124 survey the collected objects 116, the time spent surveying is tracked in addition to which objects 116 were surveyed. The recorded data can be used to affect the users and the objects 116 surveyed.

Components 108 are the building blocks of objects 116. For example, two or more components 108 can be used to create an object 116. The components 108 used to create the object 116 can expire after being used to create object 116. The created object 116 can contain attributes of the components 108 used to create object 116.

Components 108*a-b* can be exchanged between all users in the environment 100. Users can exchange tokens, components 108, objects, or other digital entities for components 108. For instance, a user can exchange tokens for a pack of components 108 from artist 104.

The movement of components 108*a-b* can be tracked to affect attributes of the components. For example, when a user exchanges tokens for a pack of components 108 from an artist 104, the number of tokens, the users involve, and other data about the transaction can be captured. The captured data can affect all parties involved including the artist 104, the user exchanging tokens, and the components 108. A builder 112*a* can combine components 108 to create an object 116. For instance, a builder 112*a* can use three components 108 to create object 116. The components 108 can have rules such that, once used to create object 116, the components 108 are no longer available for further creation of objects. In this example, the builder 112*a* can now have object 116, but can no longer use components 108 used to create the object 116.

A builder 112*a* can combine two or more components 108*a-b* to create an object 116. For example, certain components 108 can have rules, limits, or conditions that can require a certain combination of component 108 types in order to create object 116. For this example, the builder 112*a* can have components 108 that require a background component 108, a logo component 108, color component 108, and a shape component 108 in order to create an object 116.

The created object 116 can contain a combination of the attributes of components 108*a* used to create object 116. For instance, components 108*a* can contain a certain string of attributes, characteristics, or values and components 108*b* can contain a similar but different string of attributes, characteristics, or values. In this instance, when a builder 112 combines components 108*a-b*, a system, AI, or otherwise can combine the attributes, characteristics, or values of both components 108*a-b* into a new set of attributes, characteristics, or values associated with the object 116.

The created object 116 can contain a combination of the attributes of the builder 112*a* and the components 108*a*. For example, when a builder 112 combines components 108*a-b*, a system, AI, or otherwise can combine the attributes, characteristics, or values of the components 108*a-b* and the attributes, characteristics, or values of the builder 112, to create a new set of attributes, characteristics, or values associated with the object 116.

The attributes of created object 116 can change over time based on several factors include, but not limited to which consumer marketplace 120 the object 116 is in, in the one or more consumer marketplaces 120 the object 116 has been in, what interactions user have had with object 116, or any combination thereof. For instance, when an object 116 is moved from a first consumer marketplace 120 to a second consumer marketplace 120, the length of time the object 116 was in each location, the conditions under which object 116 was transferred, and other metrics can be tracked to affect the object 116 and/or the users involved with the movement of object 116.

Figure 1C:
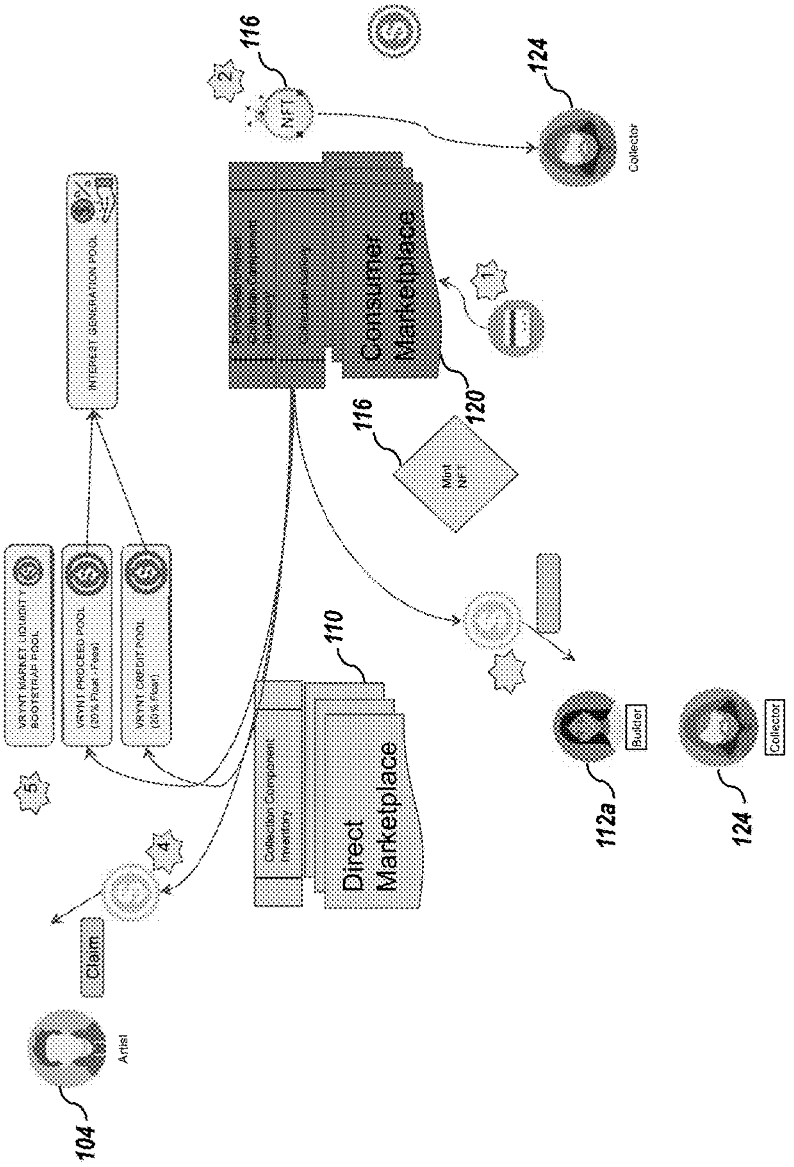
FIG. 1*c* is an example environment in which the interactions between digital entities and users affects both the digital entities and user.

FIG. 1*c* is an example environment 100 in which the interactions between digital entities and users affects both the digital entities and user. Each digital entity in the example environment 100 can have attributes associated with the digital entities. Digital entities can include, but are not limited to users, artists 104, builders 112, collectors 124, components 108, objects 112, consumer marketplace, and more. Attributes can include, but are not limited to, metrics, measurable attributes, characteristics, qualifiers, features, traits, qualities, elements, facets, or any combination thereof. The attributes of digital entities can change based on interactions in the example environment 100.

In the example environment 100 the consumer marketplace 120 can house one or more digital objects 116 and one or more components 108*a-b*. For example, users can interact with consumer marketplace 120 and can access interaction options for objects 116, components 108, artists 104, builders 112, or any combination thereof.

The example environment 100 can contain multiple marketplaces, for multiple categories of activities. For instance, consumer marketplace 120 can serve as an area in which users can interact with objects 116. In this example, direct marketplace 110 can serve as an area in which users interact with components 108.

As users interact within the environment 100, the interactions affect the components 108*a-b*, objects 116, the artist 104, the builder 112*a*, and the collector 124. User interactions throughout environment 100 can affect one or more other digital entities within the environment 100. Digital entities can include, but are not limited to users, artists 104, builders 112, collectors 124, components 108, objects 116, and any combination thereof. For example, a builder 112 can create a dozen new objects 116. The creation of a dozen objects 116 can increase the rating, experience, fame, uniqueness, and other attributes associated with the builder 112. The builder 112's changed attributes can affect further creation of objects, or interactions with other digital entities in the environment 100.

In this example, the dozen objects 116 created can have unique attributes attached to the objects. The unique attributes can be created based of measurable metrics at the time of creation including, but not limited to, the builder 112 creating the objects, the components 108 being used, the when the object 116 is being created, how many objects 116 are being created, and more. In some examples, an AI can combine the attributes from the multiple inputs to produce the attributes of the created object 116.

The interactions within environment 100 can affect the profiles of the artist 104, the builder 112*a*, and the collector 124. For instance, a created object 116 can exist in a consumer marketplace 120. Users can interact with the created object 116. The interactions with object 116 can affect the attributes of the created object 116 and the history of users who have previously interacted with the created object 116 such as the builder 112 who created the created object 116, the previous users who possessed the created object 116, and the artists 104 who created the components 108 that were used to create the created object 116.

Figure 1D:
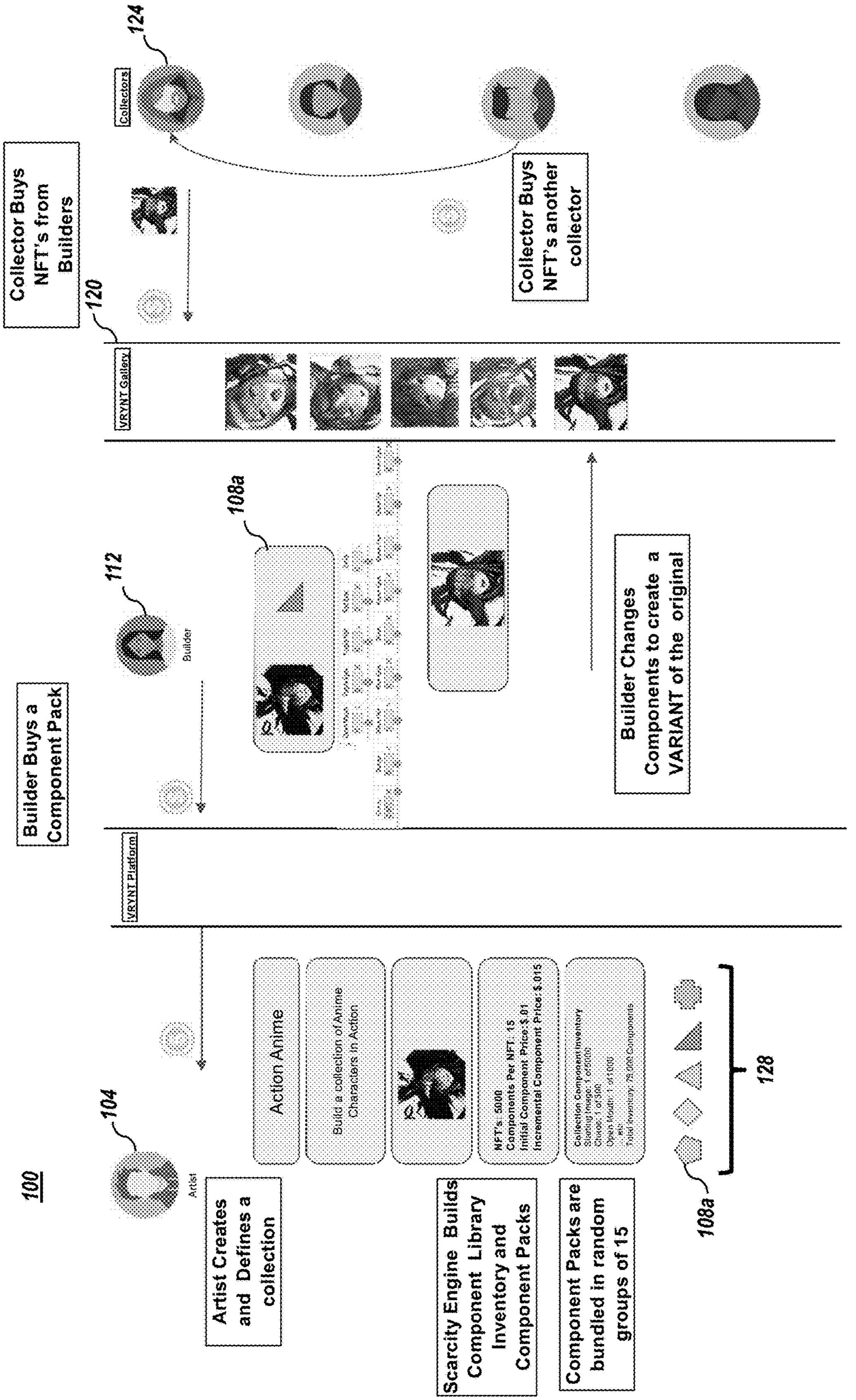
FIG. 1*d* is an example environment representing the combination of components into objects.

FIG. 1*d* is an example environment 100 representing the combination of components into objects. Artists 104 can create and define collections of components 108. An artist can bundle components 108 into a pack 128. Builders 112 can acquire components 108 or packs 128 of components 108. The builder 112 can combine two or more components 108 in order to make object 116. A builder 112 can then post the object 116 to the gallery 120. Other users including artists 104, builders 112, and collectors 124 can all interact with objects 116 in the consumer marketplace 120.

In this example components 108 can serve as the building blocks of objects 116. Two or more components 108 can combine to create an object 116. For example, components 108 can include a background image, a logo, and a shape. A builder 112 can further manipulate these components 108 while combining the components 108 into an object 116. For example, a builder can rotate, scale, flip, filter, change the position of and otherwise modify components 108 while creating an object 116.

An artist 104 can create a number of components 108*a-e*. Each of the components 108*a-e* can be different from each other. An artist can make more than the five components 108*a-e* depicted in FIG. 1*d*. For instance, the components 108 can be a background image, logo, shape, color, and filter. In some instances, the components 108 can all be filters, but each filter can be different from each, such as sepia, black and white, sharpen, vintage, or saturation. Some components 108 can be of the same theme, for instance a series of components 108 can be clothing sets for avatars, such as hats, shoes, accessories, or more. Some components 108 can have themes for events such as holidays, sporting events, movie releases or more.

An artist 104 can combine a number of components 108*a-e* into a pack. A pack 128 of components can contain a number of components defined by the artist 104 or by administrators of environment 100. A pack 128 can include any number of components 108. In some instances, a pack 128 can include one or more objects 116. An artist 104 can determine the number, type, or the combination of components 108 that can make up a pack 128. For example, an artist 104 can create a pack 128 that is all background image components 108. An artist 104 can create a pack 128 that includes sports themed components 108. An artist 104 can create a pack 128 that includes components 108 containing similar attributes such as scarcity.

An artist 104 can split components 108*a-e* in to various packs 128. For example the artist 104 can place components 108*a-b* into a first pack 128 and components 108*c-e* in a second pack 128. An artist can choose any combination of components 108*a-e* and packs 128. For example, artist 104 can create packs 128 of three components 108 each. In some examples, the artist 104 can use AI to determine the distribution of components across packs 128.

An artist 104 can define attributes, conditions, characteristics, values, and other metrics to the components 108*a-e* and packs 128. For instance, an artist 104 can create a unique component 108 for each pack 128. The unique component 108 can have a value that when combined with at least one other component 108 from the same pack 128, the created object 116 has a greater chance of having higher attributes, such as scarcity.

An artist 104 can define themes, logos, or other characteristics to components 108*a-e* and packs 128. For instance, the artist 104 can define the attributes of components 108 to have rules associated with how the components 108 are combined to make objects 116. The artist 104 can define the attributes of packs 128 to have no more than one 'ultra rare' component 108 per pack 128.

Components 108*a-e* and packs 128 can be exchanged between users in various combinations. For example, an artist 104 can create a pack 128 and exchange the pack 128 for an object 116, a different pack 128, various individual components 108 or a combination thereof.

A builder 112 can receive a pack 128 of components 108*a-e*. A builder 112 can have an inventory of packs 128, components 108, and objects 116. For instance, a builder 112 can have twenty components 108, two object 116, and five packs 128.

A pack 128 can be designed to disassociate based on certain actions. For example, a builder 112 can open a pack 128 and remove the components 108 within. Once the components 108 are removed the pack 128 no longer exists, instead the individual components 108 are added to the collection of the builder 112.

A pack 128 can have rules governing the exchange and use of the pack 128. For example, an artist 104 can set a rule that users can no see the contents of pack 128 until the pack 128 is opened. Once opened the pack 128 contents can be viewed.

A builder 112 can combine two or more components 108*a-e* in order to create a digital object 116. For instance, using rules set in the components 108, a builder 112 can create an object 116. In this instance, the builder 112 can combine two background components 108 and a logo component 108 to create an object 116.

In some examples, a template can exist that defines the number of components 108 that are required to create an object 116. In some examples, the template can require certain types of components 108 in order to create an object 116. In some examples, the template can require a minimum number of modifications form the builder 112 to create an object 116.

A builder 112 can use a user interface to affect the way in which the components 108*a-e* are combined to create digital object 116. For instance, a user can scale, rotate, size, flip, filter, and otherwise effect a component 108 prior to and during the creation of an object 116. In some instances, the component 108 can be moved and rearranged as if on a canvas. In some instances the components 108 can overlap each other in the creation of an object 116.

A builder 112 can use an AI to affect the combination of components 108*a-e* into the digital object 116. For example, a builder 112 can use AI to perform sudo-random mixtures, combinations, orientations, or otherwise of components 108 to create object 116. In some examples, the AI can aid a builder to create an object 116 that the AI believes is pleasing or visually attractive to a user.

A builder 112 can combine the digital object 116 with a cryptographic process and create an NFT. For instance, builder 112 can create digital object 116 and combine the digital object to a crypto currency, block chain, or a combination thereof to make an NFT.

The created object 116 can contain a combination of the attributes of components 108*a* used to create object 116. For example, a component 108*a* can have an attribute associating it with a limited time event such as a sports championship. Component 108*a* can be combined with component 108*b*, and the resulting object 116 can have the attributed associating the object 116 with the limited time event.

The created object 116 can contain a combination of the attributes of the builder 112*a* and the components 108*a*. For instance, a builder 112 can combine a component 108*a* with an attribute of high chaos with a component 108*b* with an attribute of no chaos. The created object 116, can have a chaos value that is different than either of the components 108*a-b* value, such as a value of low chaos.

The attributes of created object 116 can change over time based on several factors include, but not limited to which consumer marketplace 120 the object 116 is in, in which consumer marketplace 120 the object 116 has been in, what interactions user have had with object 116, or any combination thereof. For example an object 116 can become more rare over time. In some examples, an object 116 can increase in chaos as it changes possession from one builder 112 to a collector 124. In some examples, an object 116 can have an attribute of high velocity, if the object 116 moves quickly from one digital location to another such as changing possession.

Figure 2A:
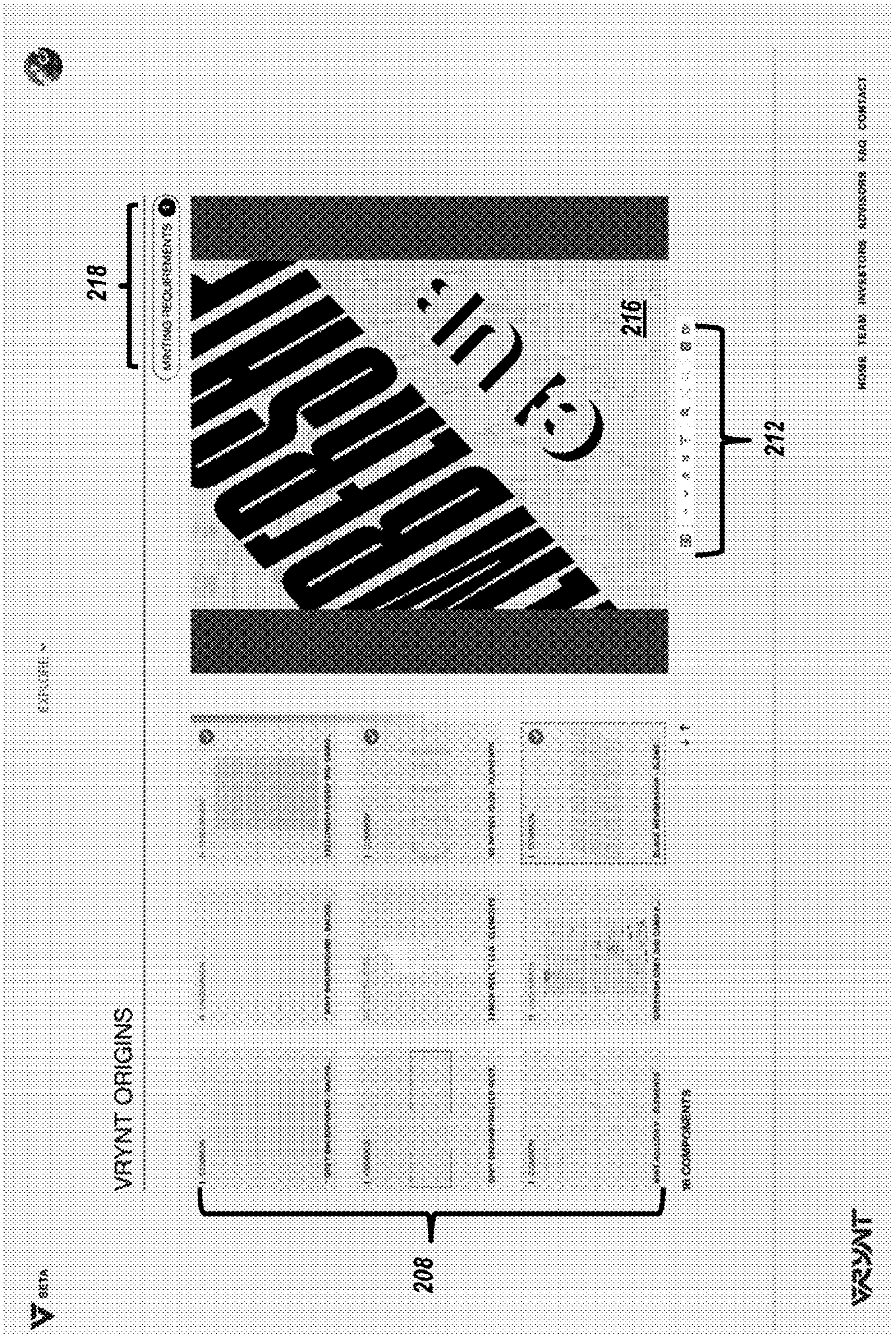
FIG. 2*a-d* is an example user interface for creating objects from components.

FIG. 2*a* is an example user interface [200] for creating objects 116 from components 208. The user interface can be used to navigate the library of components 208 held by a user. The user interface can interact with one or more components 208 to create object 116.

A user can navigate a collection of components 208. The collection can have one or more components 208 within it.

The user interface can have controls 212 to manipulate, modify, control, adjust, rotate, scale, and layer the components 208 while creating an object 116. The controls 212 can have multiple types of interface components such as sliders, buttons, drop boxes, or more.

The user interface can have a work area 216 in which a user can manipulate components before creating an object 116. The work area 216 can display a preview of what the components 208 will look like rendering a preview of the object 116. The work area 216 can be represented in different sizes, scales, areas or more. For instance, a builder can drag and rearrange components on the work area 216. The builder can use controls 212 to rotate and scale the components 208.

The user interface can include a button 218 to create the object 116. The button 218 can display the required number of components 208 required to create the object 116. For instance, the button 218 can display that four components are required to create the object 116. If four components 208 are arranged in the work area 216, then the button 218 can change from displaying the number of components 208 required to the option "create object."

FIG. 2*a*-2*d* is an example user interface for a consumer marketplace 120. The example user interface can be used to interact with, move, acquire, or manipulate components 108, objects 116, artists 104, builders 112, and collectors 124.

Figure 2B:

In FIG. 2*b* the user can navigate using buttons 220 to select the view of components, packs, and objects. The components, packs and objects can be scrolled through, interacted with, acquired, or otherwise.

Figure 2C:

In FIG. 2*c* the user can switch sections of a user's account using buttons 224. For instance, a user can switch between a marketplace, personal inventory, account settings, and more. These sections of the user interface can be used to inspect, view, investigate, manipulate, and otherwise interact with the digital entities. For instance, a user can look at the attributes of a component 208 such as the scarcity, velocity, history, uniqueness, and more.

Figure 2D:
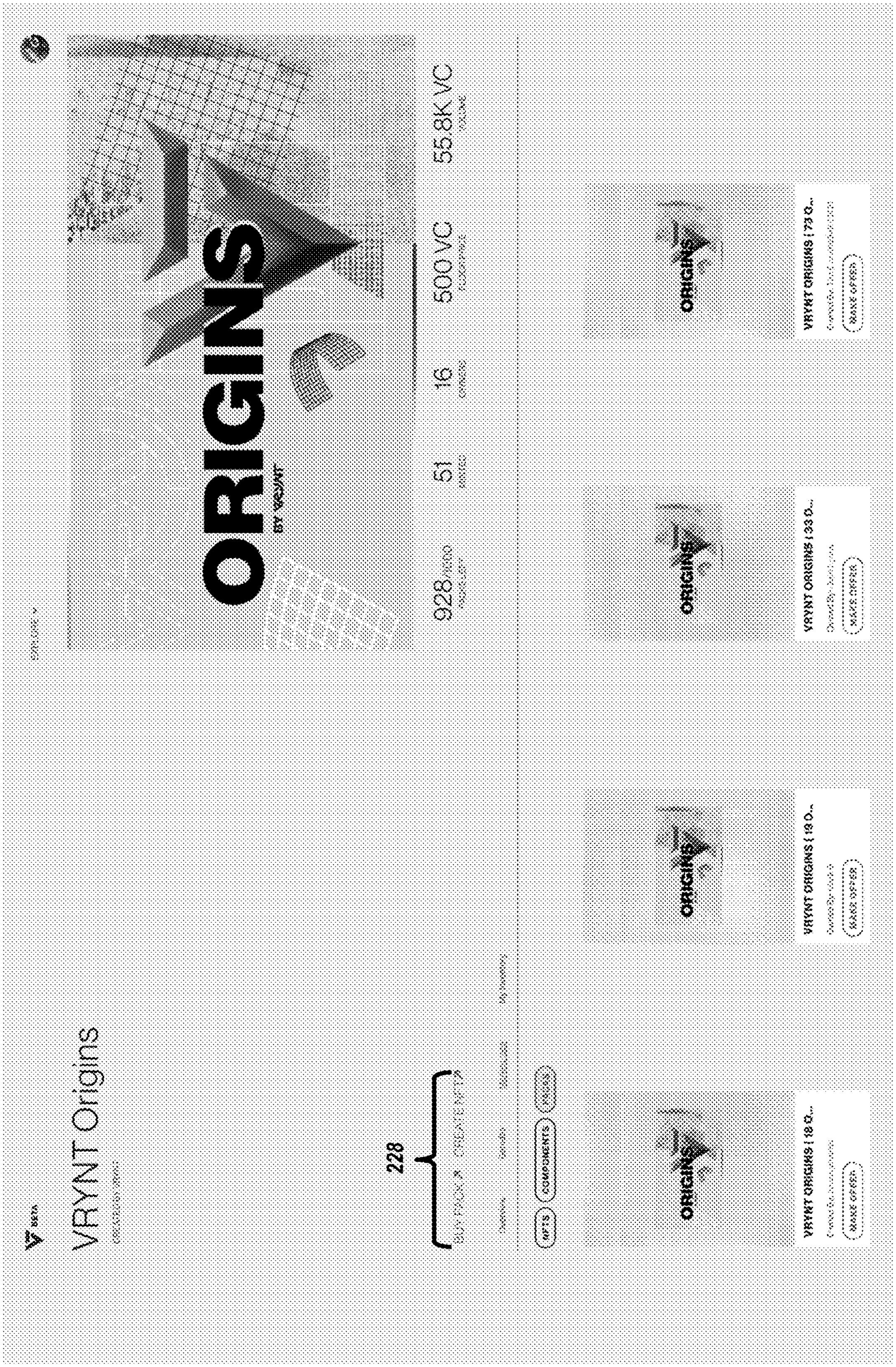

In FIG. 2*d* the user can select buttons 228 to acquire components 208 or navigate to an area to build an object 116. For example, a user can select an object from the page and then select the purchase button. In this example, a user can complete any transactions for components 208, then navigate to the section FIG. 2*a* to create an object with the acquired components 208.

Figure 3:
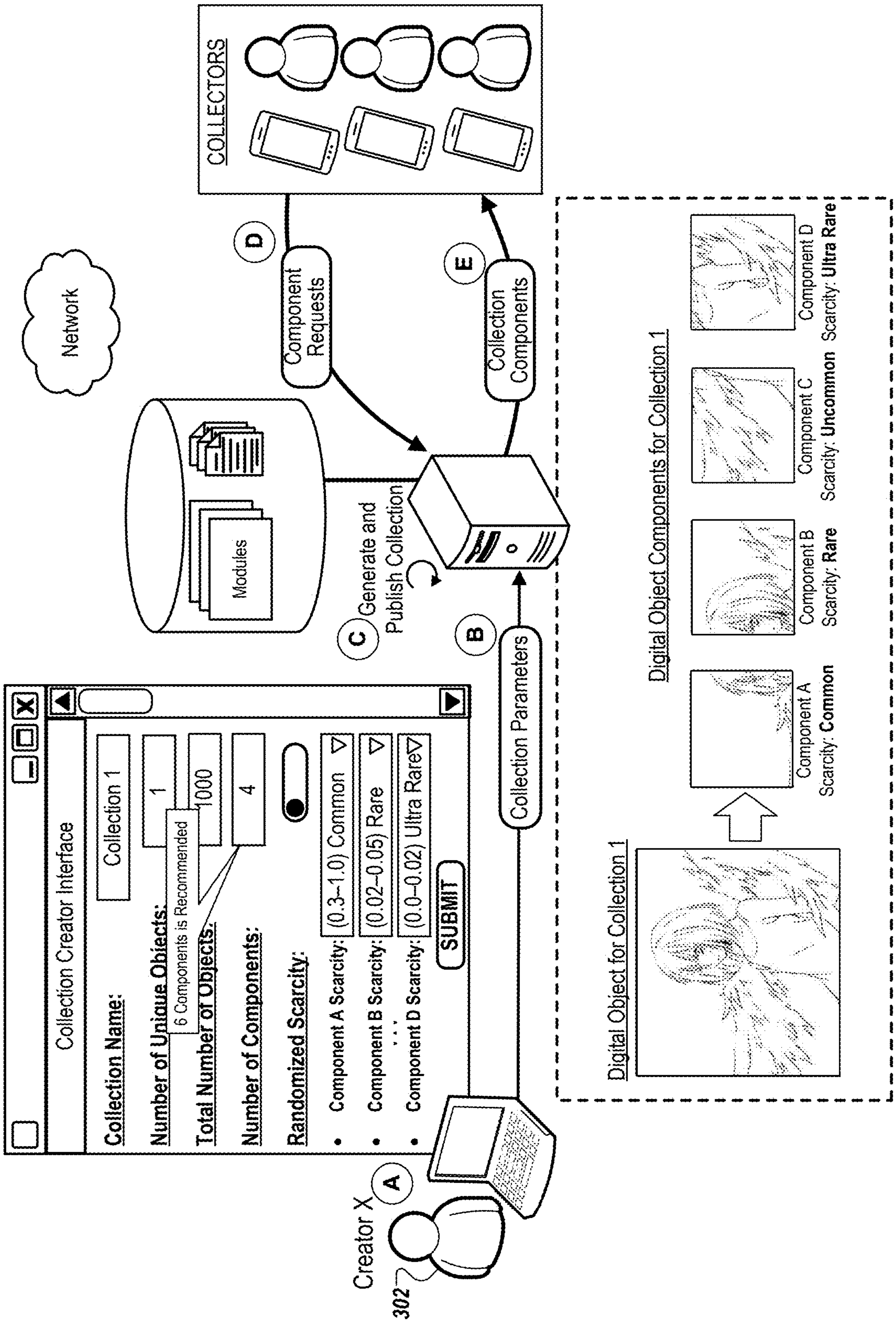
FIG. 3 is an example system diagram that illustrates the creation of digital objects using components.

FIG. 3 is an example system diagram that illustrates the creation of digital objects using components. Components are the building blocks of the digital objects. Components can be categorized into several groups representing attributes of the components. For example, a group of components can be colors and the components within that group represent the individual colors. A digital object is a combination of the components into a single object. The digital object can be a non-fungible token (NFT), piece of art, digital media, or any combination thereof. For example, a combination of primary color components can produce a digital object that is a combination of those colors or a secondary color.

In this example, the creator 302 can utilize a user interface to control the combination of components into a digital object. The creator controls a number of factors involved in the creation of the digital object in addition to which components are involved. For example, the creator can control which individual components in addition to how many total components are used to make the digital object. The creator can also control the relative influence or weight of influence each component has in the production of the digital object. For example, the creator can set prescribed minimums or maximums for the use of certain components based on their individual attributes or based on other values such as scarcity. Scarcity will be defined in greater detail later in this application.

In some configurations, the weighting factors can be randomized, influenced by the creator, or influence by machine learning (ML), or artificial intelligence (AI). For example, the AI can determine the current trends and create a digital object that is tailored to be aligned with the current trends. The AI can also predict future trends and create objects with customized appeal for the users.

The components are the building blocks of the digital objects. The components span a great variety of categories. Each category of component influences the digital object based off of the attributes within the component. For example, a first component representing water and a second component representing sand can be combined to create a digital object of the beach. The creator can adjust the percentages of water and sand in the digital object. The creator can also adjust other features that influence the digital object and add the signature of the creator into the digital object.

The components can be sectioned into categories. For example a component labeled 'water' can be in a category of components labeled 'oceans.' Each component within the category 'oceans' can be the Indian Ocean, Pacific Ocean, etc. In like manner, the category 'sand' can have various types of sand based on location, mixture ratios, style, or any combination thereof. Each of the components can have multiple underlying attributes embedded in the component that can contribute to the final digital object created. The weight of these different factors is determined by the creator's input. For example, the combination of the 'Indian Ocean' and 'Bora Bora Sand' will create a different digital object of the beach compared to the 'Atlantic Ocean' and 'Miami Beach Sand.'

In one example, components are elements without visual attributes. Some components have attributes or permutations that the AI can use to affect the visual elements or the attributes of the digital object. For example, the AI can use a component called 'AC/DC' and apply the attributes associate with the band AC/DC or the AI can include electrical elements to the digital object in reference to alternating current (AC) and direct current (DC).

The scarcity of an individual component is one of several attributes of the component. The scarcity factors are layered from component to digital object and can change over time. For example, the component 'Bora Bora Sand' can be extremely rare, but the digital object of a beach using 'Bora Bora Sand' can have a different scarcity rating based off of the factors used to create it.

The component scarcity can change based off the relative scarcity of the component in the ecosystem. For example, as the 'sand' components are used to make digital objects, the total number of 'sand' components in circulation is reduced. With fewer 'sand' components available to make digital objects, the 'sand' components become more scarce.

A digital object can be made of a combination of components that the creator chooses. For example, the creator can choose the component 'Bora Bora Sand' as component A, 'Indian Ocean water' as component B, and 'Impressionist' as component C. Component D can be chosen by an AI system, ML, creator input, collector input, or a combination thereof.

The digital object is more than just the combination of components. The digital object can be a result of the combination of components, the influence of the creator, the influence of machine learning, artificial intelligence, contributors, or more. For example, the creator can use 'Bora Bora Sand' as a source image, 'Indian Ocean water' as a color filter for blue portions in an image or graphical model, and 'Impressionist' style as a transform over the source image or graphical model. The creator can further control the ratios of each component used. For example, the creator's influence can control the 'Bora Bora Sand' to 10% of the digital object and 'Impressionist' style to 50% of the object. This can result in a digital object that is mostly water, has some sand, and a subtle impressionist style.

In some examples the combination of components can create a series of digital objects. The series of digital objects can be associated together in a collection. The collection can contribute to the rarity of both the individual digital objects and the collection as a whole. The collection can be distributed to collectors individually or together as a collection. The collections of digital object can have additional attributes contributing to the rarity of the collection. Limited releases, special editions, holidays, event-based editions or filters, theme-based components (e.g., editions or filters), and more attributes can add to the uniqueness and collectability of the collection. For example, a release of a collection of digital objects can coincide with a July 4 Centennial Celebration.

The release of digital objects occurs through a distribution system. This distribution system enables the transferring of digital objects to collectors or other creators. Several factors influence the popularity or ranking of the digital objects on the market place. For example, the digital objects can be scored based on collector review, ranking, popularity, or feedback. The creator can also rank the quality, visual appeal, significance, or other rare attributes of the digital object. A system can also calculate and rank the rarity or scarcity of the digital object. There are other factors that can further process and calculate the historical data associated with each digital object in relationship to the marketplace. For example, machine learning or artificial intelligence can calculate the real-time rarity of individual digital objects and change the quality scores over time as the creator gains popularity.

The collectors can acquire the digital objects through the distribution system. The collectors can acquire individual digital objects or collections. The collectors can transfer other digital objects through the distribution system or directly to other collectors. A collector can retain the digital object and contribute to the rarity or scarcity of the digital object. The contribution to scarcity can be affected by how long the object is held or in what location it is held. The collector can retain a collection of digital objects together and therefore influence the rarity or scarcity of both the individual digital objects and the collection.

Figure 4:
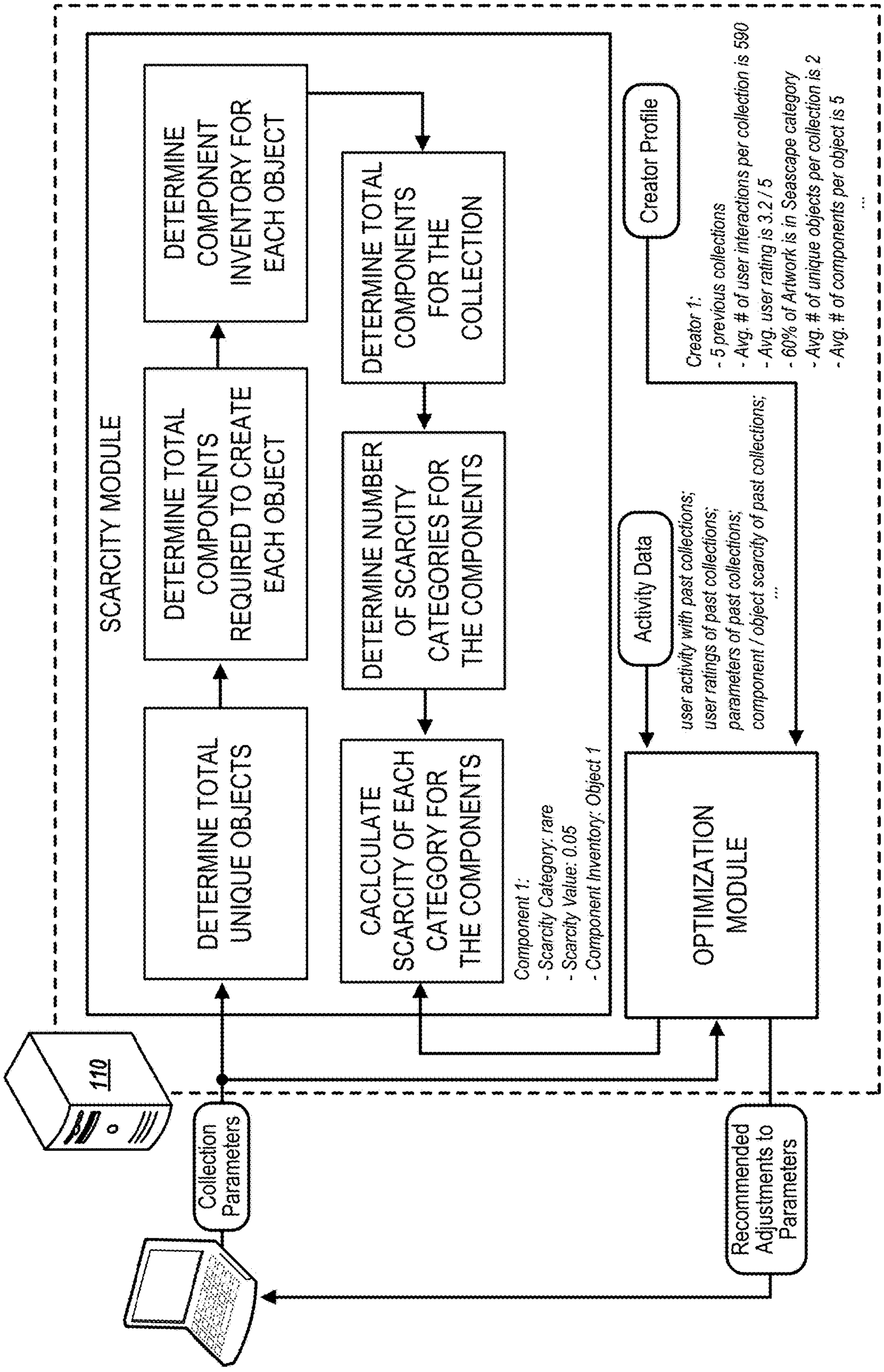
FIG. 4 is an example of the modules that can be included within a scarcity module.

FIG. 4 is an example of the modules that can be included within a scarcity module. The scarcity of the digital object can be influence by activity data, creator profiles, collection parameters, digital object attributes, historical transfer data, component attributes, component scarcity, and other digital object attributes. An example scarcity module can determine the internal attributes of the digital object, the external attributes influencing the digital object, and the total economy of digital objects and components for use in determining the scarcity of an individual digital object.

An example scarcity module can determine the total unique objects both in the total economy of objects, the creator or collector's collection, and the scarcity attributes associated with the digital objects. The calculation of the scarcity for the total unique objects can be run continuously or periodically. For example, the calculation can be a process carried out by machine learning, artificial intelligence, or manual input. The factors affecting the scarcity can also change over time. For example, the age of the digital object can affect the overall scarcity. The scarcity of the components can change as the digital objects are created because the total number of components is reduced.

An example scarcity module can determine the total number of components required to create each object. The number of components used in creating an object factor into the scarcity of the created object. For example, some objects can be made with five components and some with twenty-five components. The number of components affects the scarcity because the number of components available to create objects is limited. The scarcity associated with each component can also affect the scarcity of the object created. The creator's influence on the creation of the object can also affect the scarcity of the object created.

An example scarcity module can determine component inventory for each object. Attributes of individual components of an object can affect the objects overall scarcity. For example, if the object combines components in a way that is unique to the ecosystem, it can affect the scarcity. For example, even if the individual components of the object are not exceedingly rare, the combination of them can be rare relative to objects existing in the ecosystem. For example, if there is only one beach object available to transfer in the distribution system it becomes rarer than if more ocean objects were available.

An example scarcity module can determine the total number of components for a collection. Within a collection of objects, there can be varying numbers of components based on the components used to make each object. Again, these components have individual attributes that contribute to their scarcity as well as relative attributes. A collection using multiple 'medium' scarcity components, can sum up to more than a 'medium' scarcity object or collection if the collection has other unique features. For example, a collection of multiple objects can use different 'ocean' components through the objects. The ocean components themselves are of 'medium' scarcity, but having all the ocean within one collection adds to the scarcity. The computation of the relative scarcities and the importance of different features or attributes of the collection can be done by a machine learning algorithm or artificial intelligence.

An example scarcity module can determine the number of scarcity categories for the components. The components have a baseline scarcity by nature of the finite number of components introduced to the system. This number evolves as the components are consumed to create digital objects. The scarcity also evolves due to relative popularity, association with other scarce components in a collection, ownership by a particular creator or collector, or a variety of other reasons. Each of the different categories can be created for each digital object or collection. A collection made by a particular creator can develop a category of scarcity based off that creator. For example, a well-known company can support and create content that develops a category of scarcity based on who created it.

An example scarcity module can calculate scarcity of each category for the components. The score of scarcity can be calculated for each category that is defined. Some influencing factors for scarcity include, the scarcity of the components, the number of components, the creator who made it, the age of the object, whether the object is part of a collection or a sole object, the types of components used to make the object, the relative scarcity of the object in the ecosystem and any given time, or more. All of these can be calculated using machine learning algorithms or artificial intelligence.

An example scarcity module can be affected by an optimization module. The optimization module can take input from activity data, creator profiles, adjustment parameters, collection parameters, overall ecosystem status, time, number of components and objects in circulation, or more. The optimization module uses machine learning or artificial intelligence to adjust factors in real-time or on a periodic basis.

Figure 5A:
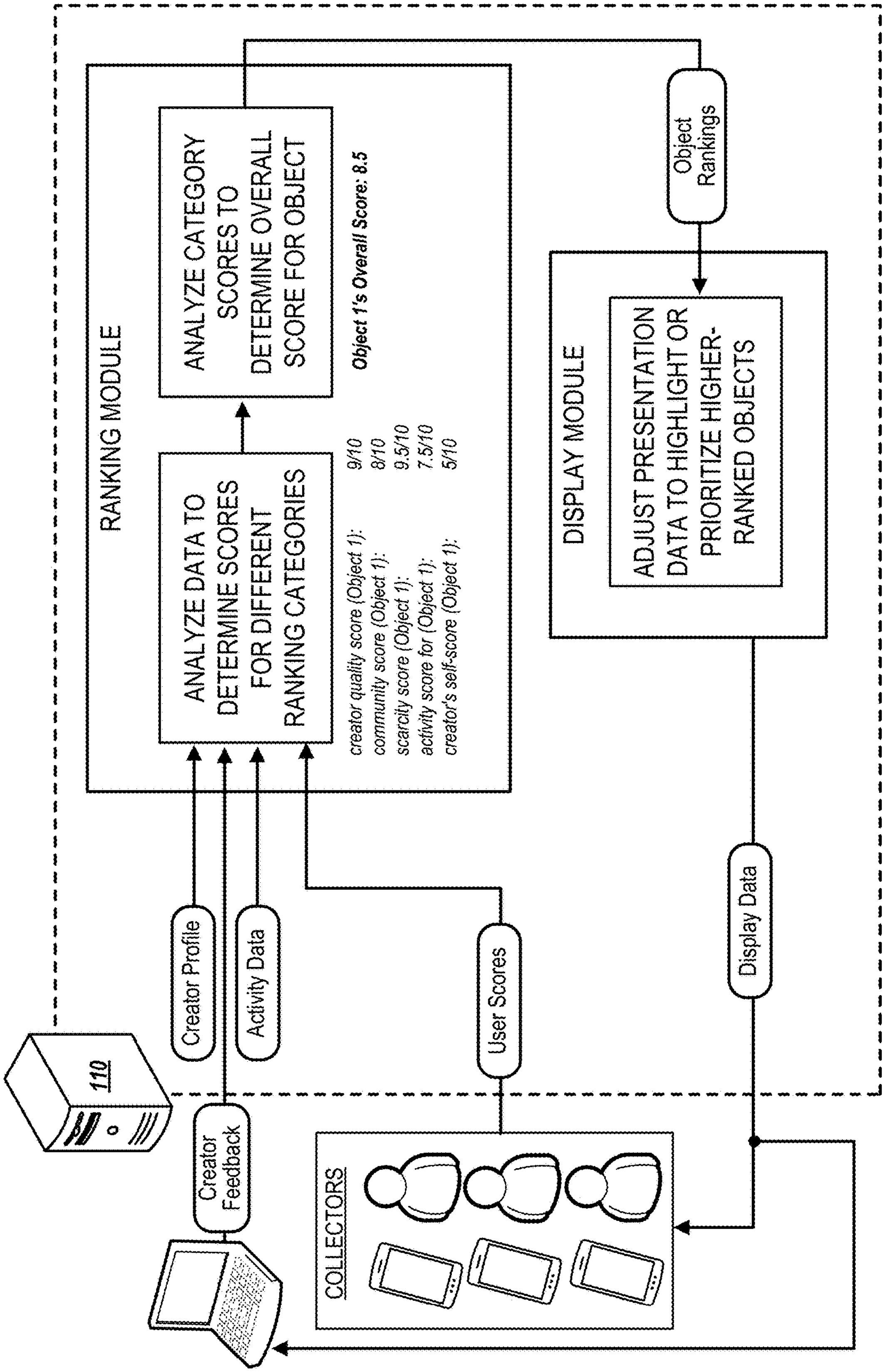
FIG. 5*a* is an example of the module that can be included within a ranking module.

FIG. 5*a* is an example of the module that can be included within a ranking module. The ranking module compares the attributes of objects and collections in order to develop a numerical ranking. The ranking of objects and collections can be throughout several categories. The categories can include creator quality scores, community scores, scarcity cores, activity scores, and creator self-scores. Categories can overlap and some rankings can include several categories.

In one example, the ranking module can analyze data to determine scores for different ranking categories. Each category is affected by the attributes and features of the objects or collections being ranked. Each category is also affected by the relative measure of the object's individual scores to that of other objects in the ecosystem. A machine learning algorithm or artificial can continuously or periodical compute the scores.

The ranking module also may analyze category scores to determine the overall score for the object. The ranking scores in the individual categories can contribute to the overall score of an object or collection of objects. Both the individual category rankings and the overall rankings can be dynamic and change as parts of the ecosystem change. A machine learning algorithm or artificial intelligence can continuously or periodically compute the scores.

In still other examples, ranking module can have inputs including creator profiles, creator feedback, activity data, user scores, and more.

Figure 5B:
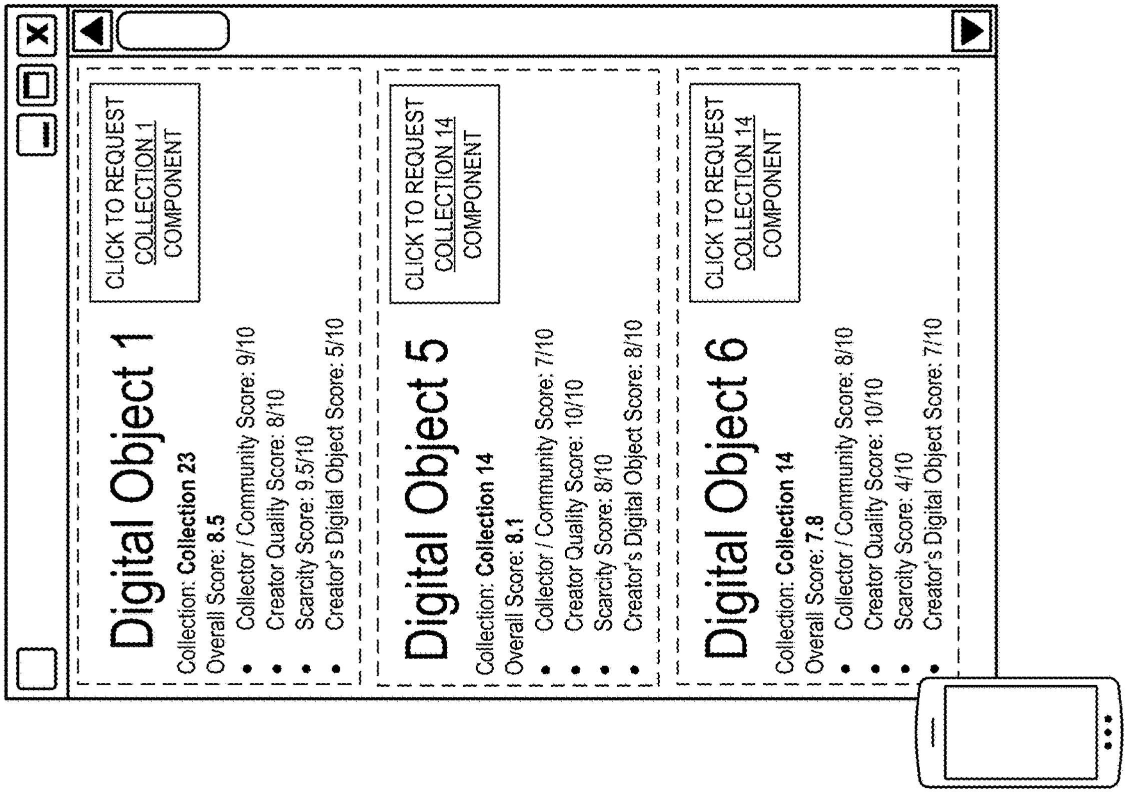
FIG. 5*b* is an example user interface for managing components and digital objects.

FIG. 5*b* is an example user interface for managing components and digital objects. A collector or creator can hold several components or objects at one time. A user can be a creator or collector. Each of the objects or components can be viewed by the respective users. Each user can also view other user's collections of components or objects.

When viewing components or objects, a user can rank them in certain categories to be displayed. The user can also filter the output in order to view specific content. For example, the user can list components, objects, or a combination thereof. The user can filter by only items containing 'water' components. The user can also filter or prioritize by scores such as scarcity, quality, popularity, or more.

Throughout the previous examples, the sequence of events and the combinations are illustrative in nature and the processes, steps, and sequences can be done in a different order, different combination, or both. For example, an artist or builder can use a mix of user input and AI input to create a component or an object. In this example, an artist can use AI to generate a background image, then the artist can add parts on top of the background image to create the component. In some examples, a builder can submit song lyrics to an AI, the AI can then return a portion of the song lyrics with some interpretation and artistic rendering. The builder can use the returned AI processed data to help augment, adjust, and edit components in the creation of objects.

All processes that apply to a builder creating objects can also apply to an artist creating components. For instance, an artist can have the same interface depicted in FIG. 2*a* to create a component from individual parts. The system and techniques need not be limited to AI-based systems. For example, a user may be given a set of two dimensional overlays and objects to add to an image.

The AI implements of the previous examples can be implemented in various ways and combinations. For example, a user can interact with an AI to mix components to make an object, or parts to make a component. A user can then adjust the inputs from the AI to further modify the parts before creating a component. In some examples, a user can input choices, then set an AI filter that can use the inputs of the user and create a visually pleasing image for the object.

A user can provide the AI various inputs, for example, words, lyrics, images, colors, shapes, other AI generated material, tokens, block chain information, addresses, dates, events, sports teams, video games, or any combination thereof. The list of inputs to the AI is for example and is not limited to those listed.

The AI can provide various outputs. For instance, an AI can have filters that design components after famous artists, certain styles, time periods, musical input, or otherwise. The list of inputs from the AI is for example and is not limited to those listed.

The AI can select the combinations that can make the final component or object. A user can provide various inputs and the AI can determine how best to arrange the materials. For example, an AI can take the components in a builder's inventory and suggest a best combination based on the attributes of the components and on what combination would be most pleasing to users.

A user can select the combination of inputs from the AI and user input to make the final component or object. For instance, an AI can provide various combination choices based on the inventory of a builder. The choices can include previews of the resulting attribute combinations and a visual display of what the object can look like. The user can then select one of the AI generated combinations.

The creation of components or objects can be guided by templates. Templates can guide the user in the number of parts required to make a component or the number of components required to make an object. Templates can guide the user to the number or type of components to be used. Templates can require a user to use a certain number or type of components. Templates can be set or created by a user or AI.

Attributes of the digital entities can include but are not limited to values, attributes, types, styles, shapes, characteristics, layout, design, and more Digital entities can have scarcity. Scarcity is a measurable attribute that can change over time. Initially, an administrator of the digital environment can control the scarcity value for components, objects, artists, builders, collectors, or any combination thereof. For example, an administrator can assign a scarcity value of 3 or 'Ultra Rare' to a component.

An artist can control the scarcity of components created by the artist. For instance, an artist can create a series of components and assign different values such as 1 or 'Common'; 2 or 'Rare'; or 3 or 'Ultra Rare.' These scarcity values may be managed under the artists control, randomly generated, or influenced by AI. For example, an artist can create components and based on AI influence, some components are assigned a value of 1 or 'Common' and some are assigned a value of 3 or 'Ultra Rare.'

The scarcity of a component or object can change over time. For instance, a component can initially have a scarcity value of 3 or 'Ultra Rare' and be combined with and 1 or 'Common' component. The combination of components can produce a new scarcity value determined by algorithms, weighting factors, or AI.

The scarcity of a component or object can change based on who created it or, alternatively, who possesses it. For example, if a prominent artist combines two components with a scarcity value of 1 or 'Common', the prominence of the artist's profile in the digital environment can affect the resulting scarcity value. The length of time that a user possess the component or object can affect the scarcity value. In one instance, if an object with a scarcity of 1 or common is held in a collection for a threshold period of time (e.g., one year), the system may revise the ability of other users to realize the same change. For example, after a year, a different user may be precluded from using purchasing or using a 1 or common control to realize that same change. Instead, a different commitment (e.g., 3 resources or "rare" level investment) may be required to secure the same modification (e.g., same look and field and/or object). That is, user possession for a threshold period of time may revise the scarcity of a component by holding it in a private gallery and not combining it with other components.

Components or objects can have history. History can track the previous ownership, the constituent parts, and other historical interactions with a component or object. For instance, an objects history can display the components used to make it, the history of the objects attributes, the previous owners, the comments ascribed to the objects, the interactions with the objects, and more.

Components or objects can have velocity. The number of movements of an object between users over a period of time can be tracked and defined as velocity. The velocity of a component or object can contribute to the scarcity of an object. For instance, an object that changes possession from one user to anther more frequently can have a higher velocity and thus affect the scarcity of that object. Likewise, an object that does not change possession very often can have a lower velocity and thus affect the scarcity of that object.

Components and objects can have uniqueness. The uniqueness of a component or object can contribute to the scarcity value. A user can assign a uniqueness value to components or an object by interacting with it. For instance, users viewing an object in a gallery can vote or contribute other content to the object that indicates the uniqueness of the object.

An example attribute can be velocity. Velocity can measure that rate at which other attributes of an entity changes. For example, an object that quickly becomes more rare and unique from the interaction of users can measure the rate of this interaction and measure it as velocity. Velocity can measure the rate at which a digital entity is interacted with by other users. For instance, a component can be viewed several hundred times a day or only a dozen times a day. Velocity can measure the rate at which a digital entity changes possession, for example a component moving from one builder to another.

In some implementations, a user can remove an object 116 from either a private gallery or the consumer market place 120. The user can move object 116 into a different digital environment separate from environment 100. For instance, the user can move a created digital object 116 into a virtual reality environment and interact with the object.

In some implementations, a user can move an object 116 outside of a digital environment. For example, a builder can create a digital object 116 that is a piece of artwork. The user can then print that digital object 116 onto a physical piece of canvas. The permissions within the environment 100 can be limited such that only the current user possessing the object 116 has the ability to physically print the digital object 116. Further, the environment (e.g., a wallet with content use restrictions participating in a block chain-based audit system) may monitor when a digital object leaves the wallet for other forum (e.g., for printing or incorporation into a virtual world).

Figure 6:
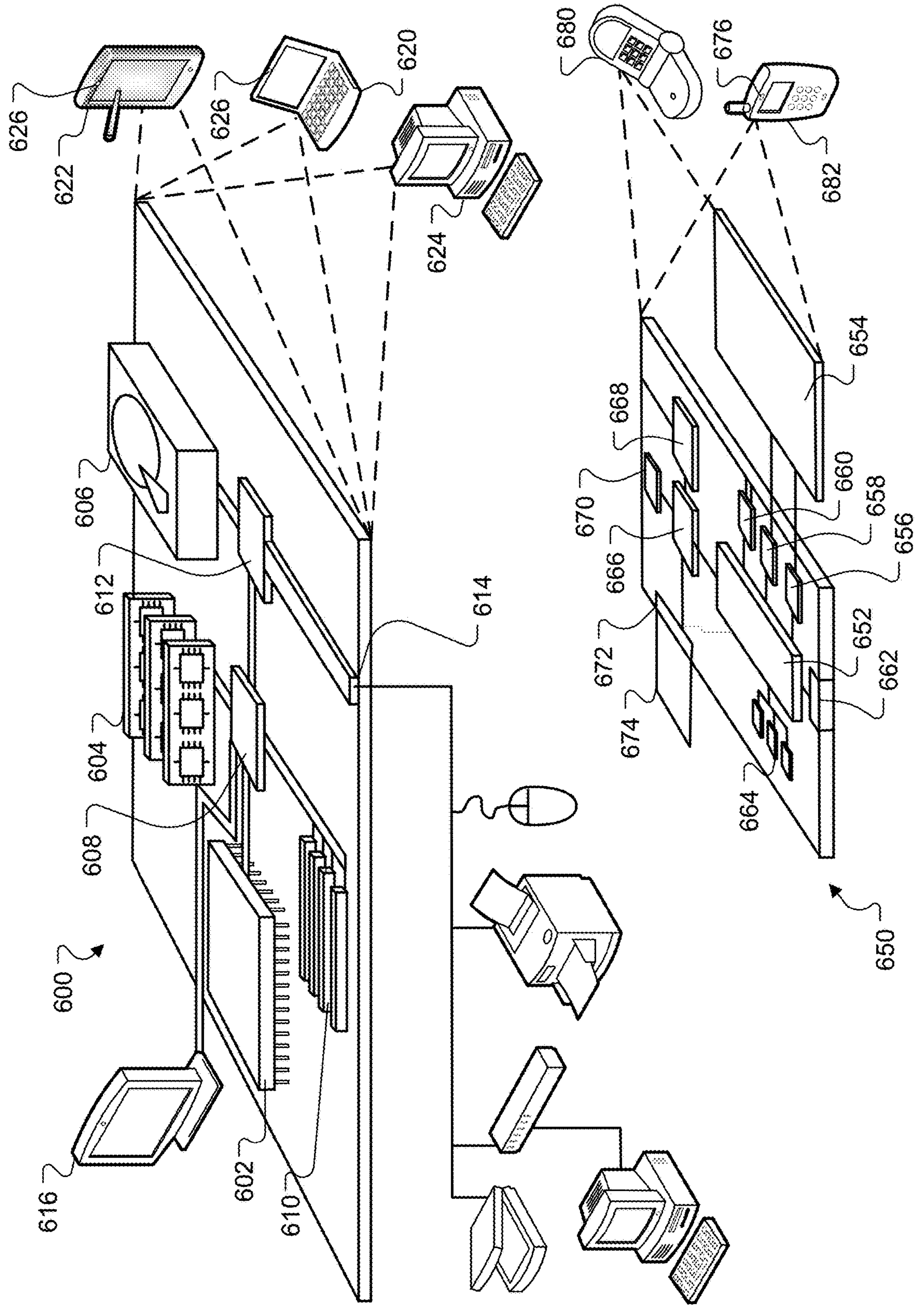
FIG. 6 shows an example of a computing device 600 and a mobile computing device 650 that can be used to implement the techniques described herein.

FIG. 6 shows an example of a computing device 600 and a mobile computing device 650 that can be used to implement the techniques described herein. The computing device 600 is intended to represent various forms of digital computers, such as laptops, desktops, workstations, personal digital assistants, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. In some examples, the computing device 600 includes a camera 626. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a graphical user interface (GUI) on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile or non-volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 602,) perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) can be coupled to one or more input/output devices, such as a keyboard, a pointing device, a scanner, a camera (e.g., a web camera), or a networking device such as a switch or router, e.g., through a network adapter.

The computing device 600 can be implemented in a number of different forms, as shown in the figure. For example, it can be implemented in a personal computer such as a laptop computer 620. It can also be implemented as a tablet computer 622 or a desktop computer 624. Alternatively, components from the computing device 600 can be combined with other components in a mobile device, such as a mobile computing device 650. Each type of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, a transceiver 668, and a camera 676, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can include appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which may include, for example, a SIMM (Single In-Line Memory Module) card interface. The expansion memory 674 may provide extra storage space for the mobile computing device 650, or may also store applications or other information for the mobile computing device 650. Specifically, the expansion memory 674 can include instructions to carry out or supplement the processes described above, and can include secure information also. Thus, for example, the expansion memory 674 can be provided as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (Code Division Multiple Access), TDMA (Time Division Multiple Access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, may include recorded sound (e.g., voice messages, music files, etc.) and may also include sound generated by applications operating on the mobile computing device 650.

The mobile computing device 650 can be implemented in a number of different forms, as shown in the figure. For example, it can be implemented as a cellular telephone 680. The mobile computing device 650 can also be implemented as part of a smart-phone 682, tablet computer, personal digital assistant, or other similar mobile device.

Figure 7:
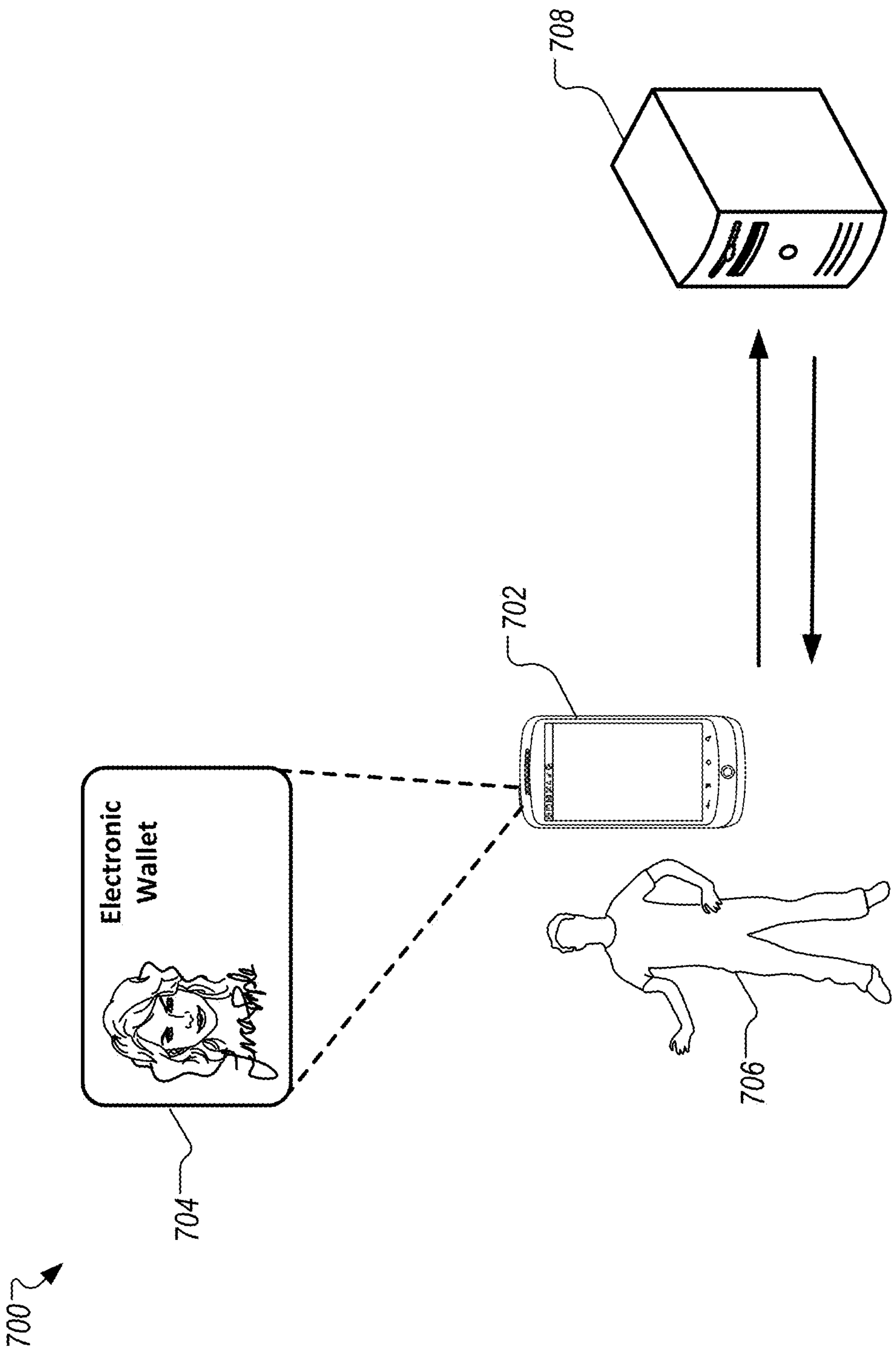
FIG. 7 illustrates an example system 700 that may be configured to implement the techniques of the present disclosure.

FIG. 7 illustrates an example system 700 that could implement the techniques of the present disclosure. System 700 includes a user computing device 702 in communication with a collection management server 708. The collection management server 708 can be a system of one or more computer servers. The collection management server 708 can be, for example, a secure data server system such as an online management system with code that transforms digital objects in accordance with transformation rules. The user computing device 702 can be, but is not limited to, a computing device such as a mobile phone, a smartphone, a tablet computer, a laptop computer, or a desktop computer. The user computing device 702 configured to capture digital images of a digital object in an electronic wallet 704. For example, user computing device 702 have an integrated digital camera or be connected a digital camera (e.g., a wired or wireless webcam). Additionally, the user computing device 702 can include a software application (e.g., a document scanning application or camera drivers) that, when executed by processor(s) of the computing device, allow the computing device to perform the image capture processes described herein.

The user computing device 702 is configured to display an image preview window when a user 706 activates the camera on the computing device 702 to capture an image of an ID document 704. FIG. 2 depicts an example image preview window. For example, the image preview window 202 includes a preview image 204 of the digital object in an electronic wallet 704. The preview image can be a real-time video stream of images of the digital object in an electronic wallet 704 as designed by the user 706 the computing device 702, however, for simplicity of discussion the video images may be referred to in the singular as a “preview image” or a “real-time image” of the digital object in an electronic wallet 704. In some examples, the preview window can also include an image capture guide. For example, image capture guide can be a graphic that is overlaid on top of the preview image of the digital object in an electronic wallet 704 to aid the user 706 with aligning a captured image in the camera’s FOV.

For example, the user computing device 702 can apply one or more image processing filters to the real-time image of the document in order to create the artificial transformation in the preview image. More specifically, one or more spatial filters can be applied to the pixels of the real-time image (e.g., each image in a video stream) to create a particular artificial transformation. For example, a skew filter may compress pixels closer to one side of a digital image to make the preview image of a digital object in an electronic wallet 704 as if the document is tilted in one direction, thereby, prompting the user 706 to tilt the captured image in the opposite direction. As another example, an image cropping filter may remove pixels on one or more sides of a digital image to make the digital object in an electronic wallet 704 in the preview image appear as if it is off-center in the camera’s FOV, thereby, prompting the user 706 to move the image towards the perceived center.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Figure 8:
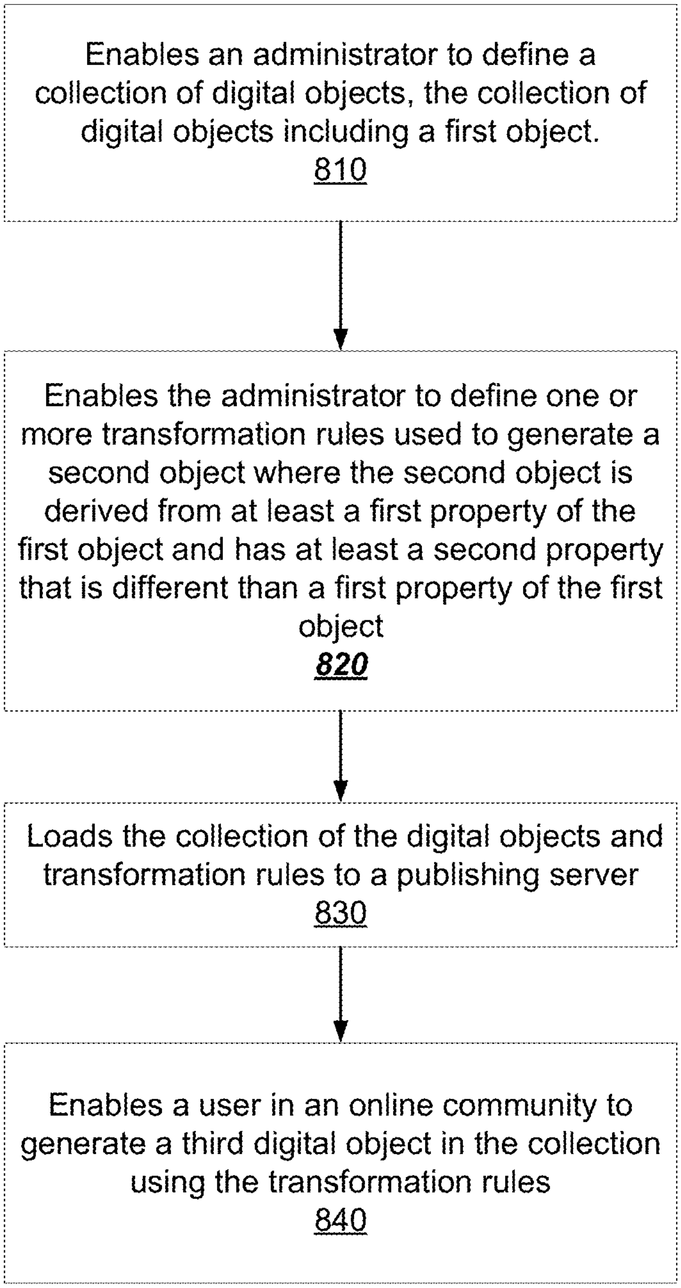
FIGS. 8-10 are flow charts of processes by which a digital collection is generated.

FIG. 8 is a flow chart of a process 800 by which an administrator enables users to generate digital objects in a collection. For example, the process 800 can be used by an artist to allow users to generate personalized artwork designed by the artist and administered through a content management so that each user gets a distinct (or even unique piece of art. The user then can import the generated digital object into a digital wallet or a collection management application. Once imported, the digital object can be used to establish proof of ownership, populate characters in a video game, or generate a movie based upon the designed artwork.

Initially, the system enables an administrator to define a collection of digital objects, the collection of digital objects including a first object (810). For example, an artist may render a drawing, import it into a web-based content sharing system, and specify controls for how the imported drawing may be used. In one configuration, the artist specifies that the drawing may be distributed into 200 different instantiations and require that each of the instantiations must be different than every other instantiation. The artist also may specify how the drawing may be modified or distributed. For example, the artist may specify that five different AI-based themes can be applied. Each of the AI-based themes may include a slider bar that applies an AI-based computational algorithm to an image. Examples of AI-based transformation include special effects designed to simulate certain environments, detail designed to provide greater texture and resolution, popularity designed to modify an image with elements from other images determined to be attractive to a population or key demographics, morphing designed to blend one or more looks or styles into a new transformational algorithm, or population designed to introduce one or more constituent things (even objects) into a larger image.

The system enables the administrator to define one or more transformation rules used to generate a second object where the second object is derived from at least a first property of the first object and has at least a second property that is different than a first property of the first object (820). In one configuration, the configurations and settings specified above by the artist are registered with a content management system to enforce and facilitate those settings. In a second configuration, the administrator adds controls described above without input from the artist. In still other configurations, some of the controls may be specified by the artist while other controls are specified by an administrator. For example, non-AI based image control tools may be specified by an artist while AI-based controls may be specified by an administrator. This may be the case where AI-based controls require consume processing resources and an administrator wants to ensure that a threshold degree of processing power remains available to support a user community. Similarly, where an administrator assigns transformation rules to a third party network-based GPU service, the administrator may want to manage costs for those services and/or configure system to ensure that the user is paying for the third party computational resources.

The transformation rules may be designed to start from a seed object and control how derivations of that seed object are generated. The transformation objects also may be used to start from a template or design framework where no user is allowed to "own" the template or design framework. Rather, a user may be presented with a minimalist object and use controls to populate the previously minimalist object. The user then may either add constituent objects to the first object or apply a transformation to the now-evolving object and visualize the impact of these changes. In some configurations, the system presents a preview mode that simulates a transformation rule without expending computational resources required to transform the object. For example, where a selected transformation requires a large amount of network processing GPUs, a computationally-efficient approximate may be used to render the resulting object.

The system may be configured to generate a second object derived from at least a first property of the first object. Where the first object includes a rendering of a superhero in a first environment (e.g., in New York), the user may generate a rendering of the user in a second environment (e.g., Atlanta), While the rendering of the superhero may be similar and or even identical, the system may preclude the generation of derivative objects until the nascent object has a threshold degree of difference from previously-generated objects. In some configurations, it must differ from other objects in the collection by at least one measure. In other configurations, it must differ my at least 5 measures. Still, other configurations may allow a threshold number of identical digital objects before the system bars a particular design in the collection from being used by other users.

The system loads the collection of the digital objects and transformation rules to a publishing server (830). Loading the collection of digital objects may include enabling users to interface with a control panel in order to consider modifications to a proposed design. The system may disable one or more devices within a control panel in order to preclude design options from being used that no longer comply with the transformation rules.

The system enables a user in an online community to generate a third digital object in the collection using the transformation rules (840). The transformation rules manage the generation of additional digital objects that are derived from at least a first property of the digital object such that it has a property that is different than other objects in the collection.

As noted earlier, once a digital object is generated, the object may be loaded to an electronic wallet. For example, the digital object may be associated with a particular permissions or rights as a backstage pass to a concert or to access a restricted area of a building. Insofar as the digital object is used as identification, the seed object may include aspects of a user's image in association with other aspects associated with the environment to which the user is being credentialed (e.g., the user's employer).

While a given object itself may be based upon a seed object from another user, the generated digital object itself may be used as a seed object for other content generation systems. For example, a comic book artist may release a collection of 50 instantiations of a superhero in a new comic book series involving the superhero. The artist may work with an administrator to present interested users with a control panel. In addition to purchasing a right to an instantiation of the superhero, i.e., a digital object in the collection of digital objects, the user may purchase additional tokens used to make additional modifications consistent with the transformation rules. The transformation rules may unlock special rights and/or power ups.

Thus, the artist may specify that ten of the digital objects may be important into an affiliated video game. The video game then may take the digital object a build a gaming environment (e.g., objectives, plot, abilities, geography, player capabilities) around the digital object. Ten of the digital objects may be exported into a music generation to generate a musical score. The musical score then may be exported to a jukebox application (e.g., Apple Music) or ported into a video game. Ten of the digital objects may be seeded into a comic book generation tool. The comic book generation tool then may use the digital object to generate a personalized comic book for the user based upon the digital object purchased by the user. The remaining digital objects may be printed to a high gloss photographic card similar to a baseball card.

An administrator may meter the export of digital objects from the collection management application to other environments. That is, the artist and/or administrator may require the expenditure of tokens in order to export the generated digital token to different environments.

The transfer of objects to additional environments may include additional instructions or controls provided by an artist, an administrator, a digital object and/or user. For example, the artist may include metadata that includes a plot of theme as an image is transferred to additional environments (e.g., villain, flies, occasional good side). As a user transfers a digital object of a superhero to a comic book generation environment, the metadata and image itself may be used to generate the content within the comic book. Similarly, a user may specify plot details as the image of a superhero is transferred to a movie making engine (e.g., superhero saves family).

The digital object may be associated with proof of ownership for a real-world object. For example, a private whisky club may release a collection of limited edition whisky. Because members often trade a selection with other club members, each bottle may be associated with a digital object. As the user orders a new release, the user may generate a digital object associated with the bottle. Once purchased, the club administrator may distribute a unique digital object with a user-specific image to go in the digital wallet of each purchasing user. The digital object also may include a link to a verifiable location on a block chain and personalized image. The club administrator then may print a personalized label on each purchased bottle corresponding to the digital object. As users consider trading, purchasing, and exchanging bottles, users may verify the digital object from a supplying user, verify the digital object with the club administrator and confirm that the label is valid as recorded by the club administrator.

Figure 9:
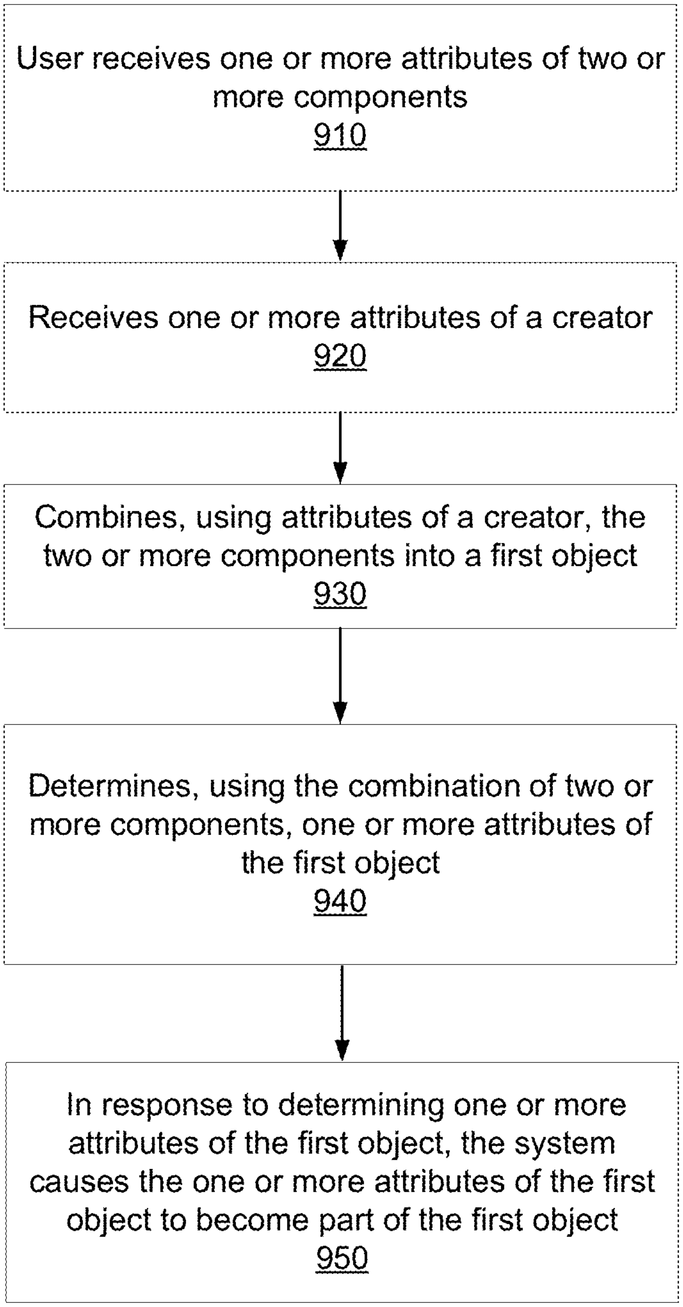

FIG. 9 is a flow chart of a process 900 by which a user may design an object within a digital collection. For example, the process 900 can be used by a user to design artwork for a helmet. Initially, the user receives one or more attributes of two or more components (910). A user may go to a web browser to select a background color, an object pattern (e.g., the team mascot), and a splatter pattern (e.g., an ornamental design superimposed over the background).

The system receives one or more attributes of a creator (920). For example, a team administrator may provide a framework from an artist controlling where objects on in a design may be placed and/or which objects may be included in a design. The system combines, using attributes of a creator, the two or more components into a first object (930). For example, the system may allow the user to design the helmet consistent with league rules on helmet design. The user may perceive a preview of the digital object.

The system then determines, using the combination of two or more components, one or more attributes of the first object (940). For example, the system may determine that a particular AI-based filter should be applied. In response to determining one or more attributes of the first object, the system causes the one or more attributes of the first object to become part of the first object (950). For example, the system may add metadata describing the change, usage, or rights for the digital object. The digital object may be written to a block chain with a setting and/or configuration for the underlying object.

Figure 10:
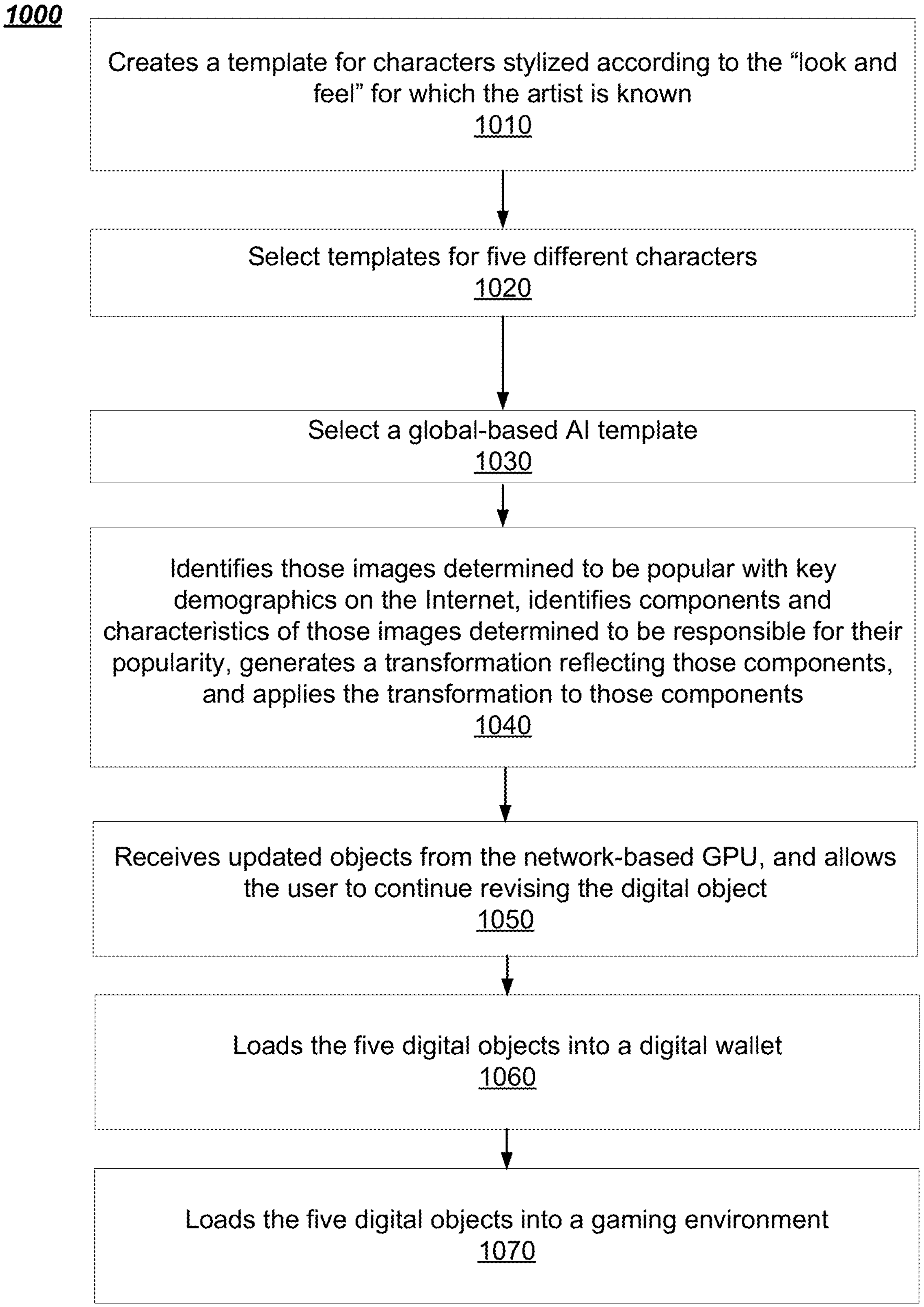

FIG. 10 is a flow chart of a process 1000 by which a user generates characters for an online role playing game. Initially, an artist creates a template for characters stylized according to the "look and feel" for which the artist is known (1010). The artist may, for example, create male and female characters reflecting 20 different character types. Within a collection of 1000 characters that will be released into a gaming environment, a user may select templates for five different characters (1020). The user may select a global-based AI template (1030), where the user applies a "popular" transformation rule designed to incorporate design elements determined to popular with users in a specified demographic. The system transfers the five digital objects to a network-based GPU server to transform the images according to a "popular" transformation. The network-based GPU identifies those images determined to be popular with key demographics on the Internet, identifies components and characteristics of those images determined to be responsible for their popularity, generates a transformation reflecting those components, and applies the transformation to those components (1040). The system then receives updated objects from the network-based GPU, and allows the user to continue revising the digital object (1050). Upon finalizing the collection, the user then loads the five digital objects into a digital wallet (1060). The user then loads the five digital objects into a gaming environment (1070).

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the system that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method of generating a digital object in a collection, the method comprising:

enabling an administrator to define a collection of digital objects, the collection of digital objects including a first digital object;

enabling the administrator to define machine-enforceable transformation rules used to generate a second digital object, the transformation rules including at least one rule having a processing commitment that specifies a metered number of processing cycles to be consumed by an processing resource when applying the transformation rules;

loading, to a publishing server, the collection of digital objects and the transformation rules;

in response to a request to generate the second digital object from the first digital object, enforcing, by the publishing server, the processing commitment by:

configuring the processing resource to execute one or more generative operations subject to the metered number, measuring processing cycles consumed during the generative operations, and preventing additional generative operations responsive to exhaustion of the metered number;

generating, by the processing resource using the processing commitment, the second digital object that is derived from at least a first property of the first digital object, and has at least a second property that is different than a first property of the first digital object; and enabling a user, via the publishing server, to generate a third digital object in the collection using the transformation rules requiring: i) the third digital object be derived using at least a first property of the first or second digital object and ii) the third digital object have at least a third property that is different than the third property of the first digital object and the second digital object;

wherein enforcing the processing commitment further comprises selectively disabling user-interface controls that would cause application of the transformation rules to exceed the metered number of processing cycles.

2. The method of claim 1 wherein enabling the administrator to define the collection of digital objects includes enabling the administrator to define the first digital object as a framework that:

(1) the user cannot be assigned ownership rights to the framework; and (2) the user selects one or more values on a control panel to transform the framework from a design template to the first digital object for which the user can be assigned ownership rights.

3. The method of claim 1 wherein enabling the administrator to define the collection of digital objects, and enabling the administrator to define the machine-enforceable transformation rules used to generate the second digital object includes:

defining the first digital object as a framework that is a design template, and enabling the user to use a control panel to perceive different instantiations of the second digital object by controlling different adjustments to the framework;

wherein the second digital object includes having the second property that makes the second digital object different from every other object in the collection of digital objects by at least one value.

4. The method of claim 1 wherein a first rule in the transformation rules includes an image modification resource that is limited and shared among the publishing server.

5. The method of claim 1 wherein the processing commitment that specifies the metered number of processing cycles to be consumed by the processing resource when applying the transformation rules includes metering the number of processing cycles based on a number of tokens allocated.

6. The method of claim 1 further comprising enabling the administrator to define a second rule in the transformation rules, wherein a first rule defines a first artificial intelligence criteria and the second rule defines a second artificial intelligence criteria, and wherein the first rule applies a first algorithm to modify the third digital object and the second rule applies a second algorithm to modify the third digital object.

7. A system comprising one or more computers and one or more storage devices on which are stored instructions that are operable, when executed by the one or more computers, to cause the one or more computers to perform operations comprising:

enabling an administrator to define a collection of digital objects, the collection of digital objects including a first digital object;

enabling the administrator to define machine-enforceable transformation rules used to generate a second digital object, the transformation rules including at least one rule having a processing commitment that specifies a metered number of processing cycles to be consumed by an processing resource when applying the transformation rules;

loading, to a publishing server, the collection of digital objects and the transformation rules;

in response to a request to generate the second digital object from the first digital object, enforcing, by the publishing server, the processing commitment by:

configuring the processing resource to execute one or more generative operations subject to the metered number, measuring processing cycles consumed during the generative operations, and preventing additional generative operations responsive to exhaustion of the metered number:

generating, by the processing resource using the processing commitment, the second digital object that is derived from at least a first property of the first digital object, and has at least a second property that is different than a first property of the first digital object; and enabling a user, via the publishing server, to generate a third digital object in the collection using the transformation rules requiring: i) the third digital object be derived using at least a first property of the first digital object and ii) the third digital object have at least a third property that is different than the third property of the first digital object and the second digital object;

wherein enforcing the processing commitment further comprises selectively disabling user-interface controls that would cause application of the transformation rules to exceed the metered number of processing cycles.

8. The system of claim 7 wherein enabling the administrator to define the collection of digital objects includes enabling the administrator to define the first digital object as a framework that (1) the user cannot be assigned ownership rights to the framework, and (2) the user selects one or more values on a control panel to transform the framework from a design template to the first digital object for which the user can be assigned ownership rights.

9. The system of claim 7 wherein enabling the administrator to define the collection of digital objects, and enabling the administrator to define the machine-enforceable transformation rules used to generate the second digital object includes:

defining the first digital object as a framework that is a design template, and enabling the user to use a control panel to perceive different instantiations of the second digital object by controlling different adjustments to the framework;

wherein the second digital object includes having the second property that makes the second digital object different from every other object in the collection of digital objects by at least one value.

10. The system of claim 7 wherein a first rule in the transformation rules includes an image modification resource that is limited and shared among the publishing server.

11. The system of claim 7 wherein the processing commitment that specifies the metered number of processing cycles to be consumed by the processing resource when applying the transformation rules includes metering the number of processing cycles based on a number of tokens allocated.

12. The system of claim 7 further comprising enabling the administrator to define a second rule in the transformation rules, wherein a first rule defines a first artificial intelligence criteria and the second rule defines a second artificial intelligence criteria, and wherein the first rule applies a first algorithm to modify the third digital object and the second rule applies a second algorithm to modify the third digital object.

13. One or more non-transitory computer storage media encoded with instructions that, when executed by one or more computers, cause the one or more computers to perform operations comprising:

enabling an administrator to define a collection of digital objects, the collection of digital objects including a first digital object;

enabling the administrator to define machine-enforceable transformation rules used to generate a second digital object, the transformation rules including at least one rule having a processing commitment that specifies a metered number of processing cycles to be consumed by an processing resource when applying the transformation rules;

loading, to a publishing server, the collection of digital objects and the transformation rules;

in response to a request to generate the second digital object from the first digital object, enforcing, by the publishing server, the processing commitment by:

configuring the processing resource to execute one or more generative operations subject to the metered number, measuring processing cycles consumed during the generative operations, and preventing additional generative operations responsive to exhaustion of the metered number;

generating, by the processing resource using the processing commitment, the second digital object that is derived from at least a first property of the first digital object, and has at least a second property that is different than a first property of the first digital object; and enabling a user, via the publishing server, to generate a third digital object in the collection using the transformation rules requiring: i) the third digital object be derived using at least a first property of the first or second digital object and ii) the third digital object have at least a third property that is different than the third property of the first digital object and the second digital object;

wherein enforcing the processing commitment further comprises selectively disabling user-interface controls that would cause application of the transformation rules to exceed the metered number of processing cycles.

14. The computer storage media of claim 13 wherein enabling the administrator to define the collection of digital objects includes enabling the administrator to define the first digital object as a framework that (1) the user cannot be assigned ownership rights to the framework, and (2) the user selects one or more values on a control panel to transform the framework from a design template to the first digital object for which the user can be assigned ownership rights.

15. The computer storage media of claim 13 wherein enabling the administrator to define the collection of digital objects, and enabling the administrator to define the one or more transformation rules used to generate the second digital object includes:

defining the first digital object as a framework that is a design template, and enabling the user to use a control panel to perceive different instantiations of the second digital object by controlling different adjustments to the framework;

wherein the second digital object includes having the second property that makes the second digital object different from every other object in the collection of digital objects by at least one value.

16. The computer storage media of claim 13 wherein the processing commitment that specifies the metered number of processing cycles to be consumed by the processing resource when applying the transformation rules includes metering the number of processing cycles based on a number of tokens allocated.

17. The computer storage media of claim 13 further comprising:

recording a description of the third digital object on a blockchain and enabling an online community to inspect the blockchain.

18. The computer storage media of claim 13 further comprising enabling the administrator to define a second rule in the transformation rules, wherein a first rule defines a first artificial intelligence criteria and the second rule defines a second artificial intelligence criteria, and wherein the first rule applies a first algorithm to modify the third digital object and the second rule applies a second algorithm to modify the third digital object.

19. The method of claim 1, wherein enforcing the processing commitment further comprises, when a prospective operation would exceed the metered number of processing cycles, rendering a preview of a transformation result without expending the metered number of processing cycles.

20. The method of claim 1, wherein enabling the user to generate the third digital object includes receiving, together with a keyword prompt, a numeric input specifying a number of processing units to be used, and enforcing the processing commitment according to the numeric input.

21. The method of claim 1, wherein enforcing the processing commitment is performed for a third-party network GPU service to manage resources while maintaining a threshold degree of processing power for a user community.

22. The system of claim 7, wherein enforcing the processing commitment further comprises, when a prospective operation would exceed the metered number of processing cycles, rendering a preview of a transformation result without expending the metered number of processing cycles.

23. The system of claim 7, wherein enabling the user to generate the third digital object includes receiving, together with a keyword prompt, a numeric input specifying a number of processing units to be used, and enforcing the processing commitment according to the numeric input.

24. The system of claim 7, wherein enforcing the processing commitment is performed for a third party network GPU service to manage costs while maintaining a threshold degree of processing power for a user community.

* * * * *